(12) United States Patent  
Taylor et al.

(10) Patent No.: US 7,013,465 B1  
(45) Date of Patent: Mar. 14, 2006

(54) SYSTEM, DEVICE AND METHOD FOR INTERPROCESSOR COMMUNICATION IN A COMPUTER SYSTEM

(75) Inventors: Alan L. Taylor, Cary, NC (US); Jeffrey Lucovsky, Cary, NC (US); Karl Owen, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/376,173

(22) Filed: Aug. 17, 1999

(51) Int. Cl.  
*G06F 3/00* (2006.01)

(52) U.S. Cl. ........................ 719/313; 719/315; 719/330

(58) Field of Classification Search ............... 709/310; 719/310, 314, 312–315, 330  
See application file for complete search history.

(56) References Cited

U.S. PATENT DOCUMENTS

| | | | | |
|---|---|---|---|---|
| 5,434,975 A | * | 7/1995 | Allen .......................... | 709/312 |
| 5,561,809 A | * | 10/1996 | Elko et al. .................. | 709/213 |
| 5,617,570 A | * | 4/1997 | Russell et al. .............. | 719/312 |
| 5,734,903 A | * | 3/1998 | Saulpaugh et al. ......... | 709/316 |
| 5,926,636 A | * | 7/1999 | Lam et al. .................. | 719/313 |
| 6,192,419 B1 | * | 2/2001 | Aditham et al. ............ | 719/315 |
| 6,226,666 B1 | * | 5/2001 | Chang et al. ............... | 709/202 |
| 6,401,109 B1 | * | 6/2002 | Heiney et al. .............. | 709/310 |

OTHER PUBLICATIONS

"Client Object Model for Distributed Servers," Jul. 1996, IBM Technical Disclosure Bulletin, vol. 39 issue 7.*

* cited by examiner

*Primary Examiner*—W. Thomson  
*Assistant Examiner*—Li Zhen  
(74) *Attorney, Agent, or Firm*—Bromberg & Sunstein LLP

(57) ABSTRACT

A system, device, and method for interprocessor communication in a computer system utilizes a special Message Passing Service (MPS) to provide interprocessor communications. The MPS enables a client application running on one processor in a computer to communicate with a target application running a different processor in the same or a different computer. In order for the client application to communicate with the target application, the client application establishes a session to the target application over an existing communication link using the MPS. The MPS provides for both synchronous and asynchronous communication services. When the client application establishes the session to the target application, the client application specifies, among other things, a "callback" routine. The MPS invokes the "callback" routine to report certain asynchronous events to the client application. The MPS blocks the client application during certain synchronous operations so that the client application does not proceed until the synchronous operation is completed.

18 Claims, 18 Drawing Sheets

SYSTEM, DEVICE AND METHOD FOR INTERPROCESSOR COMMUNICATION IN A COMPUTER SYSTEM

CROSS-REFERENCE TO RELATED APPLICATIONS

The following commonly-owned United States patent applications may be related to the subject patent application, and are hereby incorporated by reference in their entireties:

U.S. Pat. No. 6,832,379 entitled A COMPUTER ARCHITECTURE UTILIZING LAYERED DEVICE DRIVERS, filed in the names of David Zeryck, Dave Harvey, and Jeffrey Lucovsky on even date herewith; and U.S. Pat. No. 6,671,705 entitled REMOTE MIRRORING SYSTEM, DEVICE, AND METHOD, filed in the names of Dennis Duprey and Jeffrey Lucovsky on even date herewith.

FIELD OF THE INVENTION

The present invention relates generally to computer systems, and more particularly to interprocessor communication in a distributed computer system.

BACKGROUND OF THE INVENTION

In today's information age, it is common for multiple computers to be internetworked over a communication network. Each computer has one or more processors, and runs various software applications on each processor. In certain situations, it is necessary for an application running on one processor in one computer to interoperate with a peer application running on another processor in the same or a different computer.

Typically, peer applications running on different processors within the same computer utilize a different communication mechanism than peer applications running on different processors within different computers. For example, peer applications running on different processors within the same computer may utilize operating system mechanisms to communicate, while peer applications running on different processors within different computers may utilize a communication protocol to communicate. This makes it difficult to write applications for the computers, since the applications must support different communication mechanisms.

Thus, there is a need for an interprocessor communication mechanism that enables an application running on one processor in a computer to communicate with a peer application running on a different processor in the same or a different computer.

SUMMARY OF THE INVENTION

In accordance with one aspect of the invention, a Message Passing Service (MPS) provides interprocessor communications between a number of peer applications running on different processors.

In accordance with another aspect of the invention, the MPS provides synchronous communication services for a client application by blocking the client application during a synchronous communication operation and unblocking the client application upon completion of the synchronous communication operation. The MPS preferably blocks the client application by suspending the operating system task associated with the client application. By blocking the client application during the synchronous communication operation, the client application does not continue processing until the synchronous communication operation is completed.

One synchronous operation is sending a synchronous message. Upon receiving a request from the client application for sending a synchronous message, the MPS blocks the client application and sends the synchronous message to a designated target application. The MPS then waits for a confirmation from the target application. Upon receiving the confirmation from the target application, the MPS unblocks the client application.

Another synchronous operation is receiving a synchronous message. Upon receiving a request from the client application for receiving a synchronous message, the MPS determines whether a received message is available for the client application. If a received message is not available for the client application, then the MPS blocks the client application and waits for a synchronous message to be received for the client application. Upon receiving the synchronous message for the client application, the MPS unblocks the client application and passes the message to the client application.

In accordance with another aspect of the invention, a Message Passing Service (MPS) provides asynchronous communication services for a client application by using an asynchronous signaling mechanism, such as a "callback" routine, for notifying the client application of certain asynchronous events. In a preferred embodiment, when the client application opens a MPS session, the client application specifies, among other things, a "callback" routine for receiving asynchronous events. The MPS invokes the "callback" routine in order to report asynchronous events to the client application. For example, the MPS invokes the "callback" routine when the MPS receives an asynchronous message for the client application, the MPS receives confirmation from a target application in response to an asynchronous message, or the MPS closes the MPS session.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

As described above, there is a need for a interprocessor communication mechanism that enables an application running on one processor in a computer to communicate with a peer application running on a different processor in the same or a different computer. An embodiment of the present invention utilizes a special Message Passing Service (MPS) to enable peer applications running on different processors to communicate with one another. The preferred MPS is connectionless, in that a client application running on a client processor can communicate with any of a number of target applications running on different target processors in the same or a different computer. Even though the MPS itself is connectionless, the MPS allows the client application to establish a connection-like association with a particular target application using an abstraction called a "filament." For convenience, the client application running on the client processor is referred to hereinafter as the "MPS Client" application, while the target application running on the target processor is referred to hereinafter as the "MPS Target" application.

Figure 1A:
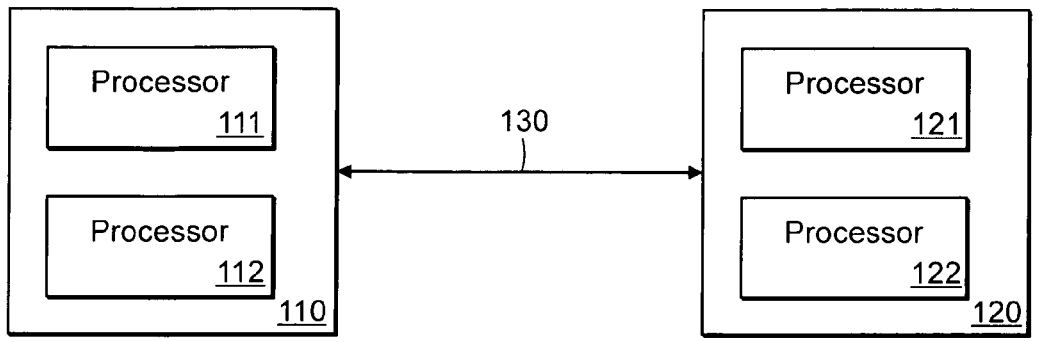
FIG. 1A is a block diagram showing an exemplary computer system including two interconnected computers in accordance with an embodiment of the present invention.

FIG. 1A is a block diagram showing an exemplary computer system including a first computer 110 coupled to a second computer 120 through a connection 130. Each computer 110 and 120 may include one, two, or more processors. In the exemplary computer system shown in FIG. 1A, each computer 110 and 120 includes two processors. Specifically, the computer 110 includes processors 111 and 112, and the computer 120 includes processors 121 and 122.

Figure 1B:
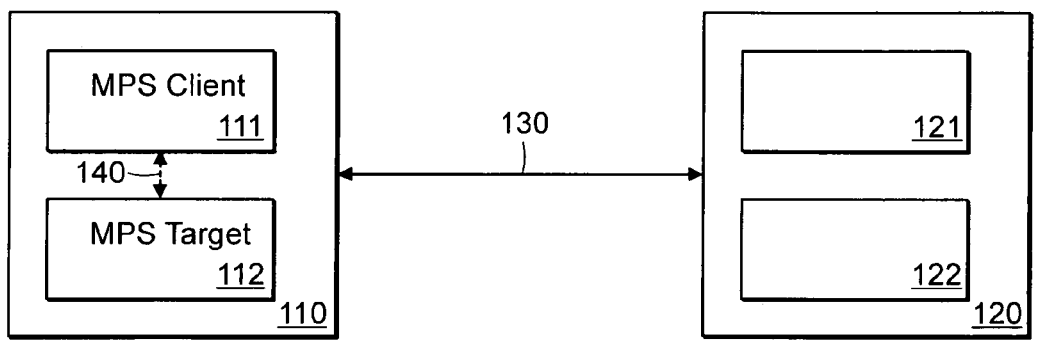
FIG. 1B is a block diagram showing an exemplary computer system in which the client application and the target application run on different processors within the same computer in accordance with an embodiment of the present invention.
Figure 1C:
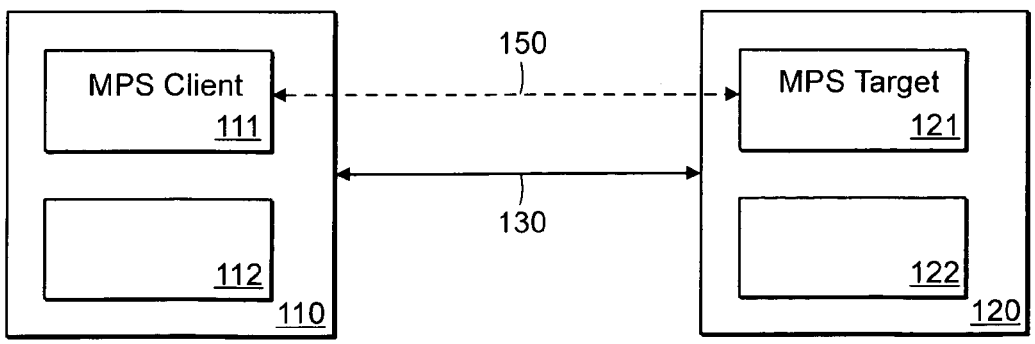
FIG. 1C is a block diagram showing an exemplary computer system in which the client application runs on a processor in one computer and the target application runs on a processor in a different computer in accordance with an embodiment of the present invention.

The MPS allows the MPS Client running on one processor to communicate with the MPS Target running on a different processor within the same or a different computer. FIG. 1B shows an exemplary computer system in which the MPS Client runs on the processor 111 and the MPS Target runs on the processor 112 within the computer 110. FIG. 1C shows an exemplary computer system in which the MPS Client runs on the processor 111 within the computer 110 and the MPS Target runs on the processor 121 within the computer 120.

In order for the MPS Client to communicate with various target applications, such as the MPS Target, the MPS Client opens a MPS session. The MPS session allows the MPS Client to communicate with any of a number of MPS Target applications running on different processors in the same computer or in different computers. Each MPS application is associated with an address. The MPS Client uses the MPS Target address for sending messages to the MPS Target and receiving messages from the MPS Target.

The MPS Client may establish a connection-like association (referred to as a "filament") to a particular MPS Target over an existing communication link from the client processor to the target processor, specifically by opening a separate MPS session for the filament. FIG. 1B shows a filament 140 from the MPS Client 111 to the MPS Target 112 within the computer 110. FIG. 1C shows a filament 150 from the MPS Client 111 in the computer 110 to the MPS Target 121 within the computer 120. The MPS is capable of multiplexing multiple filaments over a single communication link, and is also capable of supporting multiple filaments from the MPS Client to different MPS Targets over one or more communication links. Filaments can be dynamically added to and removed from a communication link.

The MPS provides both synchronous and asynchronous communication services for the MPS Client. Some communication services are always handled synchronously, some communication services are always handled asynchronously, and some communication services can be handled either synchronously or asynchronously as specified by the MPS Client.

When the MPS Client requests a synchronous communication service, the MPS "blocks" the MPS Client if the MPS cannot immediately complete the requested communication service so that the MPS Client cannot continue processing until the requested communication service is completed. In a preferred embodiment of the present invention, the MPS "blocks" the MPS Client by suspending the corresponding operating system task. The MPS "unblocks" the MPS Client upon completion of the requested communication service.

When the MPS Client requests an asynchronous communication service, the MPS Client continues processing, and the MPS notifies the MPS Client when the requested communication service is completed via an asynchronous signaling mechanism. The MPS also uses the asynchronous signaling mechanism to notify the MPS Client of other asynchronous events. In a preferred embodiment of the present invention, the asynchronous signaling mechanism utilizes a "callback" routine that is provided by the MPS Client when the MPS session is opened and is called by the MPS to notify the MPS Client of the asynchronous event.

One communication service provided by the MPS is a message sending service. The message sending service enables the MPS Client to send a message to the MPS Target over the MPS session. The message sending service can be completed synchronously or asynchronously as specified by the MPS Client. When the MPS Client wants to send a message, the MPS Client makes a request to the MPS identifying the message to be sent and specifying whether the message is a synchronous message or an asynchronous message. The MPS sends the message to the MPS Target over the MPS session. A tag is included along with the message indicating whether the message is a synchronous message or an asynchronous message. The MPS Target sends a confirmation in response to each received message. If the message is a synchronous message, then the MPS "blocks" the MPS Client until the confirmation is received from the MPS Target. If the message is an asynchronous message, then the MPS Client continues processing, and the MPS notifies the MPS Client via the asynchronous signaling mechanism when the confirmation is received from the MPS Target.

Another communication service provided by the MPS is a message receiving service. The message receiving service enables the MPS Client to receive a message from the MPS Target over the MPS session. Like the message transmission service, the message receiving service can be completed synchronously or asynchronously. Each message received by the MPS includes a tag that indicates whether the message is a synchronous message or an asynchronous message. The MPS sends an asynchronous message to the MPS Client via the asynchronous signaling mechanism. The MPS holds a synchronous message for the MPS Client until the MPS Client explicitly retrieves the synchronous message from the MPS by making an explicit request to the MPS. Upon receiving the request for the synchronous message, the MPS passes a synchronous message to the MPS Client, if a synchronous message had previously been received for the MPS Client, or else "blocks" the MPS Client until a synchronous message is received for the MPS Client.

Therefore, when the MPS receives a synchronous message for the MPS Client, the MPS determines whether the MPS Client is "blocked" awaiting a synchronous message. If the MPS Client is "blocked" awaiting a synchronous message, then the MPS "unblocks" the MPS Client and passes the message to the MPS Client. If the MPS Client is not "blocked" awaiting a synchronous message, then the MPS saves the synchronous message on a received message queue associated with the MPS session. The MPS maintains a received message queue for each MPS session.

In a preferred embodiment of the present invention, the MPS sends and receives messages using services provided by an underlying transport layer. The underlying transport layer passes received messages to the MPS in transport layer buffers. In order to prevent the underlying transport layer from becoming "deadlocked" for lack of resources, the transport layer buffers must be released as quickly as possible. This is not a particular problem for asynchronous message processing, since the MPS immediately passes asynchronous messages to the MPS Client using the asynchronous signaling mechanism, and therefore the MPS Client processes asynchronous messages quickly and releases asynchronous message resources quickly. However, it is a potential problem for synchronous message processing, since the MPS may store synchronous messages for the MPS Client on the receive message queue pending a request from the MPS Client, and therefore there may be substantial delay in processing synchronous messages and releasing the underlying transport layer buffers. Consequently, the MPS preferably copies synchronous messages from the transport layer buffers into MPS receive message buffers, and releases the transport layer buffers. The MPS then passes the MPS receive message buffers to the MPS Client.

Figure 2:
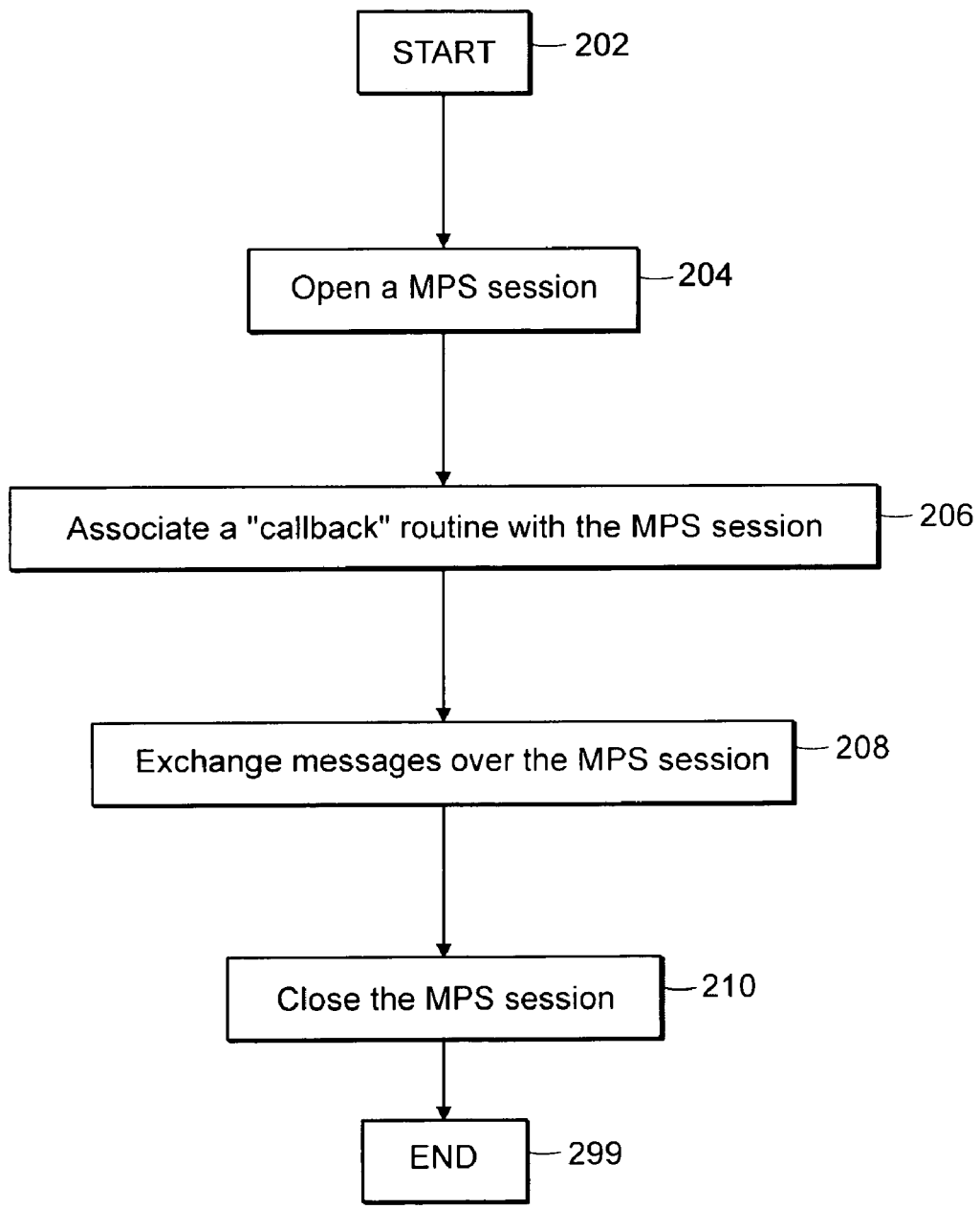
FIG. 2 is a logic flow diagram showing exemplary Message Passing Service logic in accordance with an embodiment of the present invention.

Thus, as shown in FIG. 2, the MPS enables the MPS Client to open a MPS session, in step 204, and to associate with the MPS session a "callback" routine that the MPS uses to notify the MPS Client of certain asynchronous events, in step 206. Once the MPS session is opened, the MPS enables the MPS Client to exchange messages over the connection, in step 208. When the MPS session is no longer needed, the MPS enables the MPS Client to close the MPS session, in step 210.

The MPS provides both synchronous and asynchronous communication services for the MPS Client. Providing a synchronous communication service may involve blocking the MPS Client during certain synchronous operations in order to complete those synchronous operations before the MPS Client proceeds with other operations. Providing an asynchronous communication service involves an asynchronous signaling mechanism that is used to notify the MPS Client of certain asynchronous events. The asynchronous signaling mechanism preferably uses a "callback" routine that is provided by the MPS Client. The MPS invokes the "callback" routine to notify the MPS of an asynchronous event.

Figure 3:
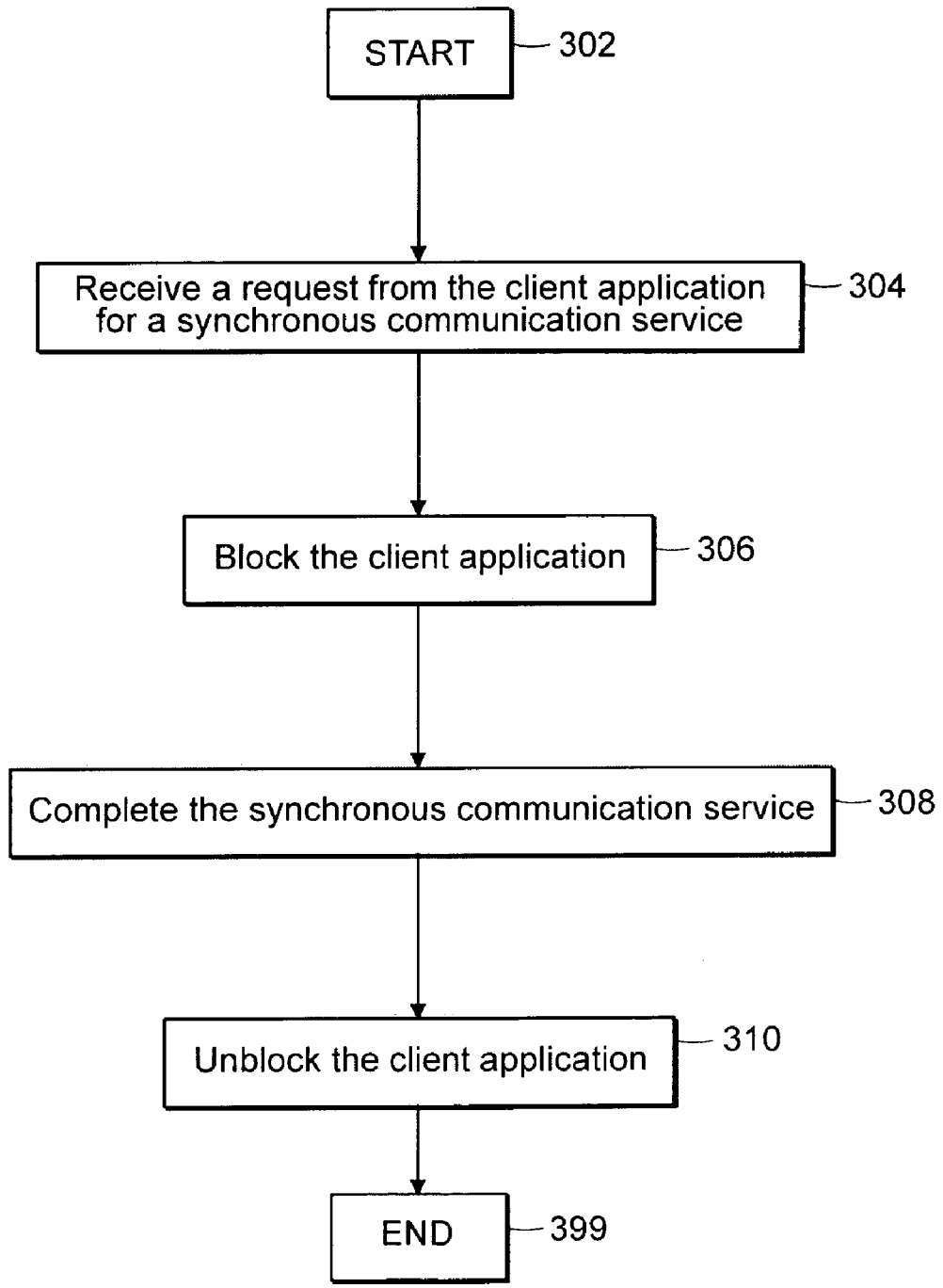
FIG. 3 is a logic flow diagram showing exemplary Message Passing Service logic for providing a synchronous communication service in accordance with an embodiment of the present invention.

FIG. 3 is a logic flow diagram showing exemplary MPS logic for providing synchronous communication services. Beginning in step 302, and upon receiving a request from the MPS Client for a synchronous communication service, in step 304, the MPS first blocks the MPS Client, in step 306. The MPS then completes the synchronous communication service, in step 308, and unblocks the MPS Client, in step 310. The logic terminates in step 399.

Figure 4:
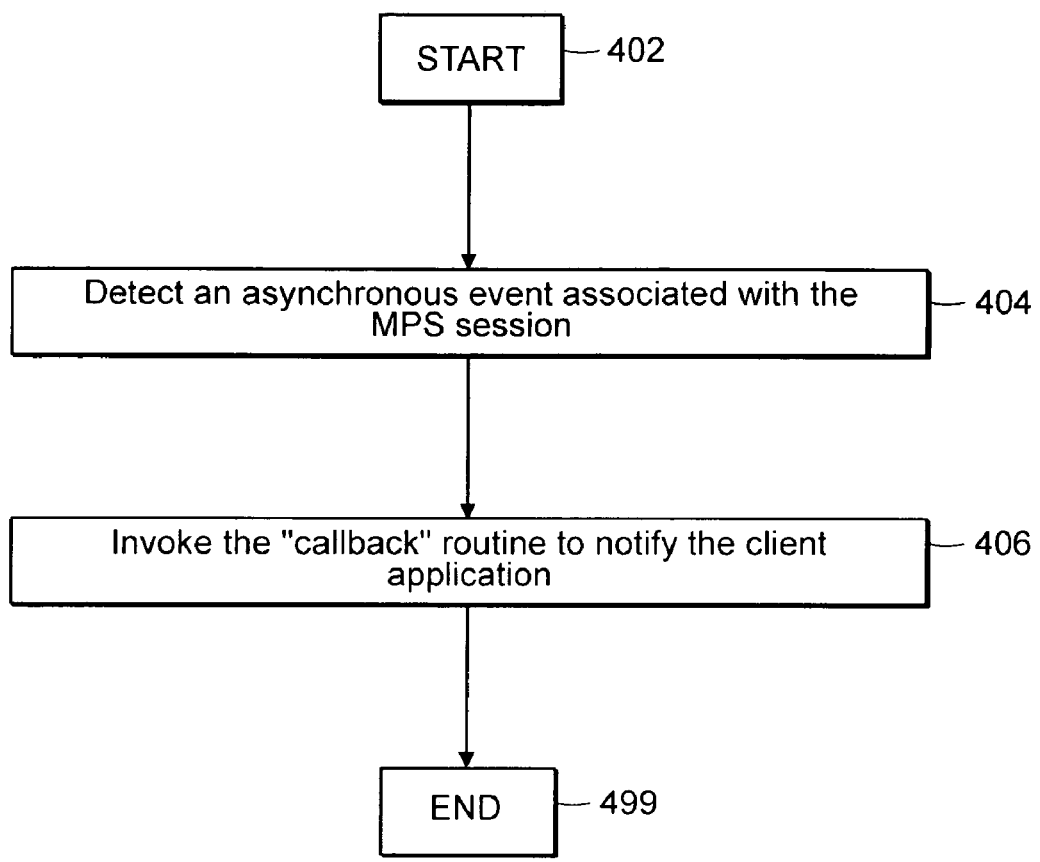
FIG. 4 is a logic flow diagram showing exemplary Message Passing Service logic for providing an asynchronous communication service in accordance with an embodiment of the present invention.

FIG. 4 is a logic flow diagram showing exemplary MPS logic for providing asynchronous communication services. Beginning in step 402, and upon detecting an asynchronous event associated with the MPS session, in step 404, the MPS invokes the "callback" routine to notify the client application of the asynchronous event, in step 406. The logic terminates in step 499.

Figure 5:
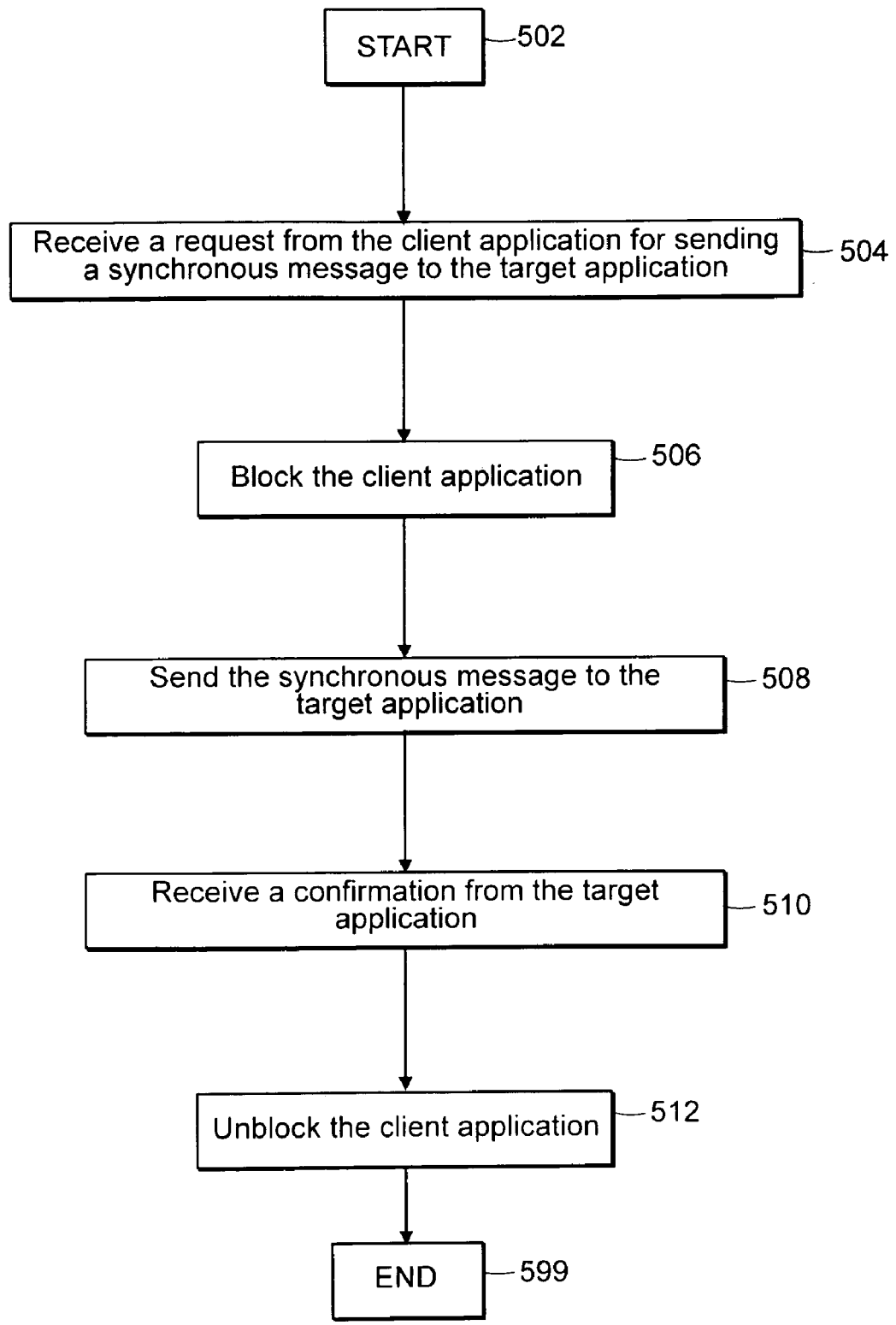
FIG. 5 is a logic flow diagram showing exemplary Message Passing Service logic for sending a synchronous message in accordance with an embodiment of the present invention.

FIG. 5 is a logic flow diagram showing exemplary MPS logic for sending a synchronous message. Beginning in step 502, and upon receiving a request from the MPS Client for sending a synchronous message to a specified MPS Target, in step 504, the MPS first blocks the MPS Client, in step 506. The MPS then sends the synchronous message to the MPS Target, in step 508. The synchronous message includes a tag indicating that the message is a synchronous (as opposed to an asynchronous) message. Upon receiving a confirmation from the MPS Target, in step 510, the MPS unblocks the MPS Client, in step 512. The logic terminates in step 599.

Figure 6:
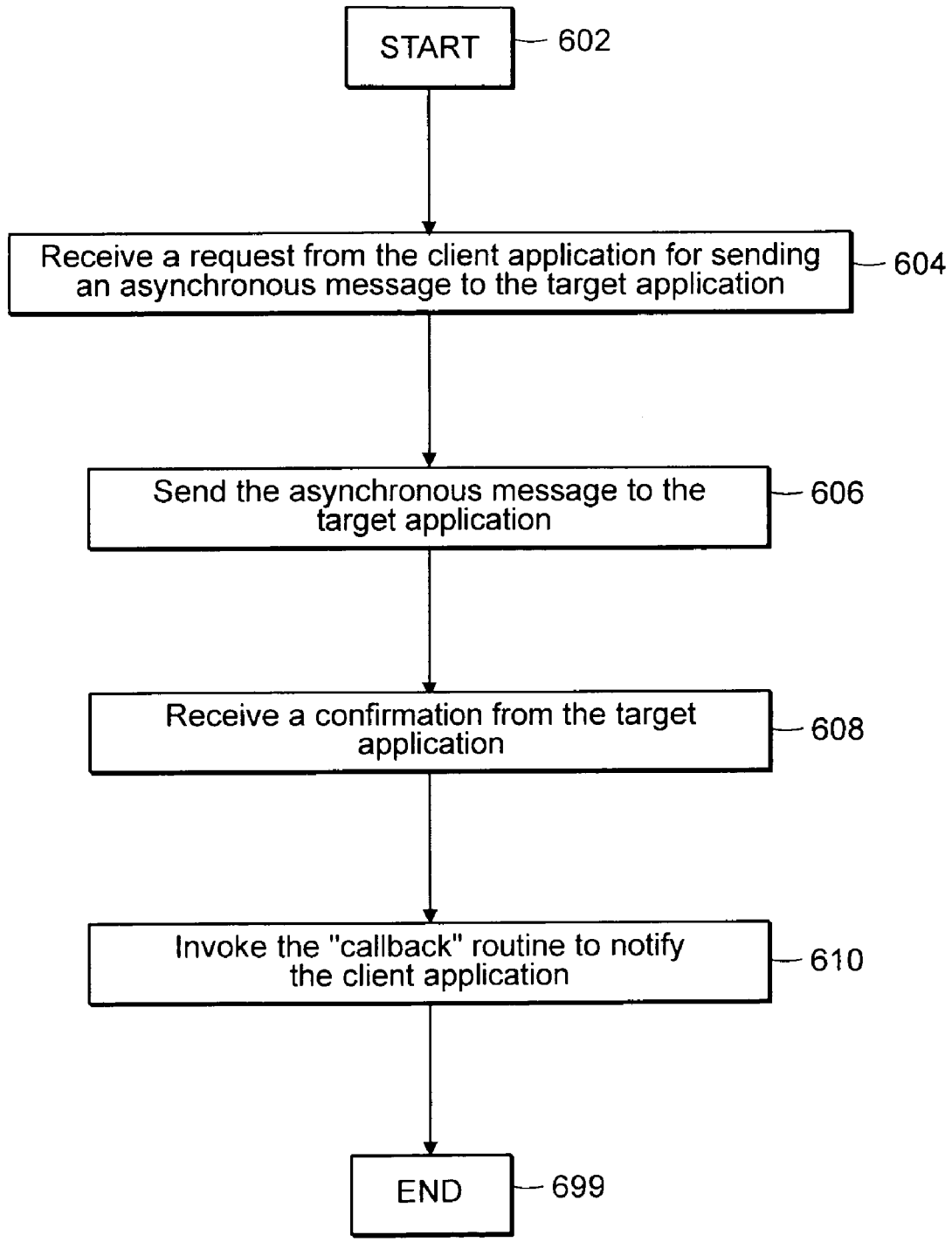
FIG. 6 is a logic flow diagram showing exemplary Message Passing Service logic for sending an asynchronous message in accordance with an embodiment of the present invention.

FIG. 6 is a logic flow diagram showing exemplary MPS logic for sending an asynchronous message. Beginning in step 602, and upon receiving a request from the MPS Client for sending an asynchronous message to a specified MPS Target, in step 604, the MPS sends the asynchronous message to the MPS Target, in step 606. The asynchronous message includes a tag indicating that the message is an asynchronous (as opposed to a synchronous) message. Upon receiving a confirmation from the MPS Target, in step 608, the MPS invokes the "callback" routine to notify the MPS Client, in step 610. The logic terminates in step 699.

Figure 7:
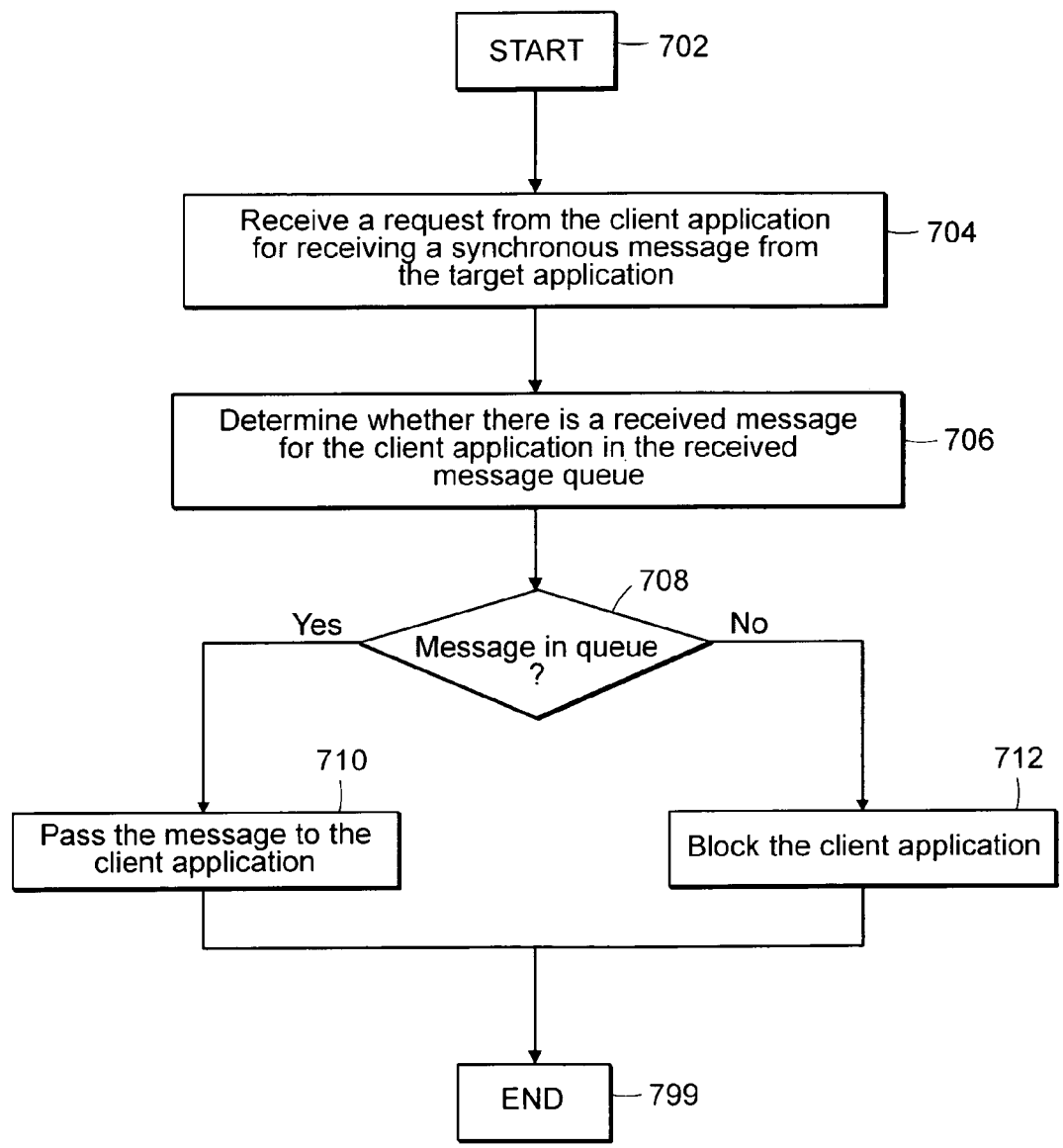
FIG. 7 is a logic flow diagram showing exemplary Message Passing Service logic for receiving a synchronous message in accordance with an embodiment of the present invention.

FIG. 7 is a logic flow diagram showing exemplary MPS logic for receiving a synchronous message. Beginning in step 702, and upon receiving a request from the MPS Client for receiving a synchronous message from the MPS Target, in step 704, the MPS first determines whether there is a received message for the MPS Client in the received message queue associated with the MPS session, in step 706. If there is a received message for the MPS Client in the received message queue (YES in step 708), then the MPS passes the message to the MPS Client, in step 710. However, if there is no received message for the MPS Client in the received message queue (NO in step 708), then the MPS blocks the MPS Client, in step 712. The logic terminates in step 799.

Figure 8A:
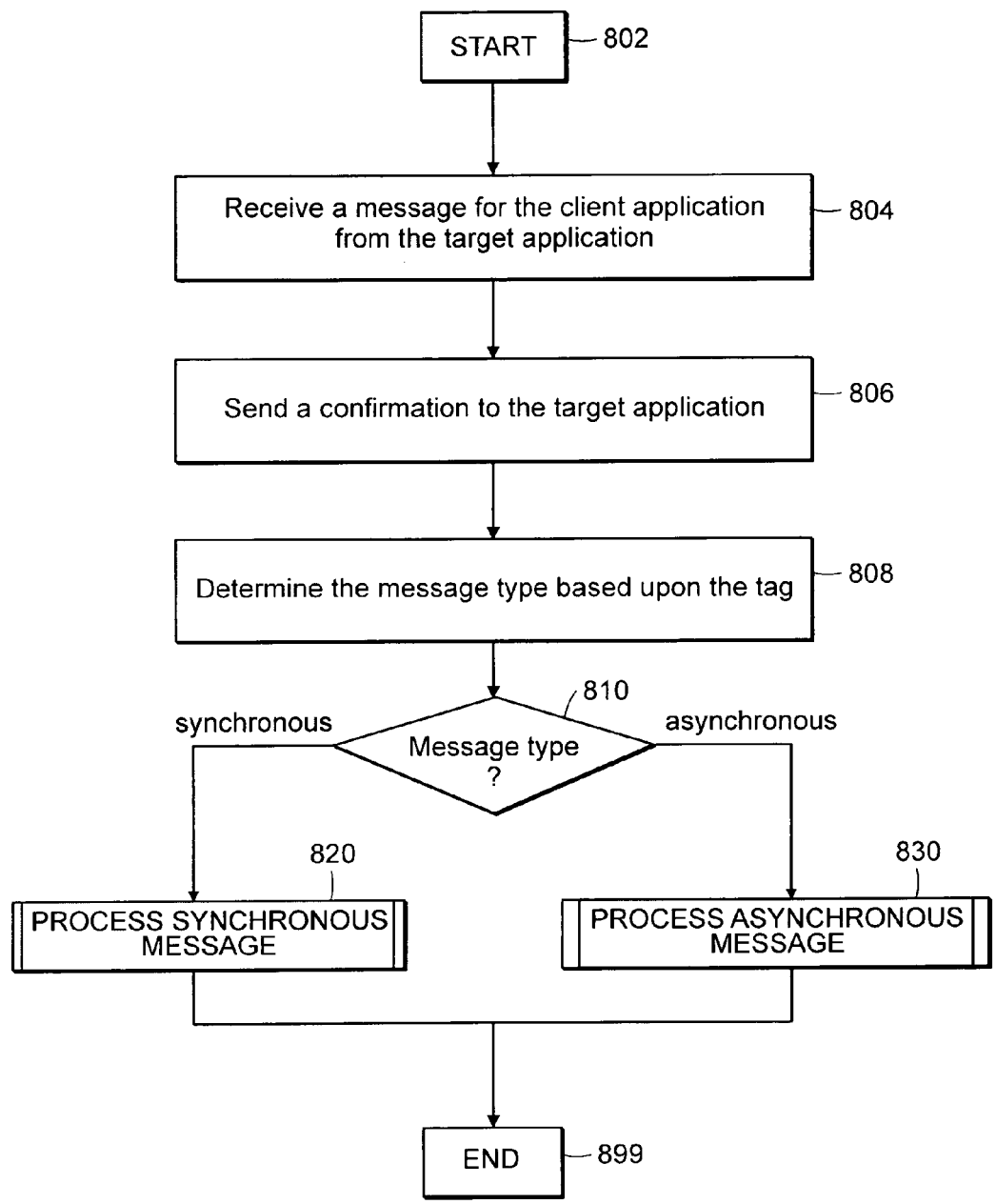
FIG. 8A is a logic flow diagram showing exemplary Message Passing Service logic for processing a received message in accordance with an embodiment of the present invention.
Figure 8B:
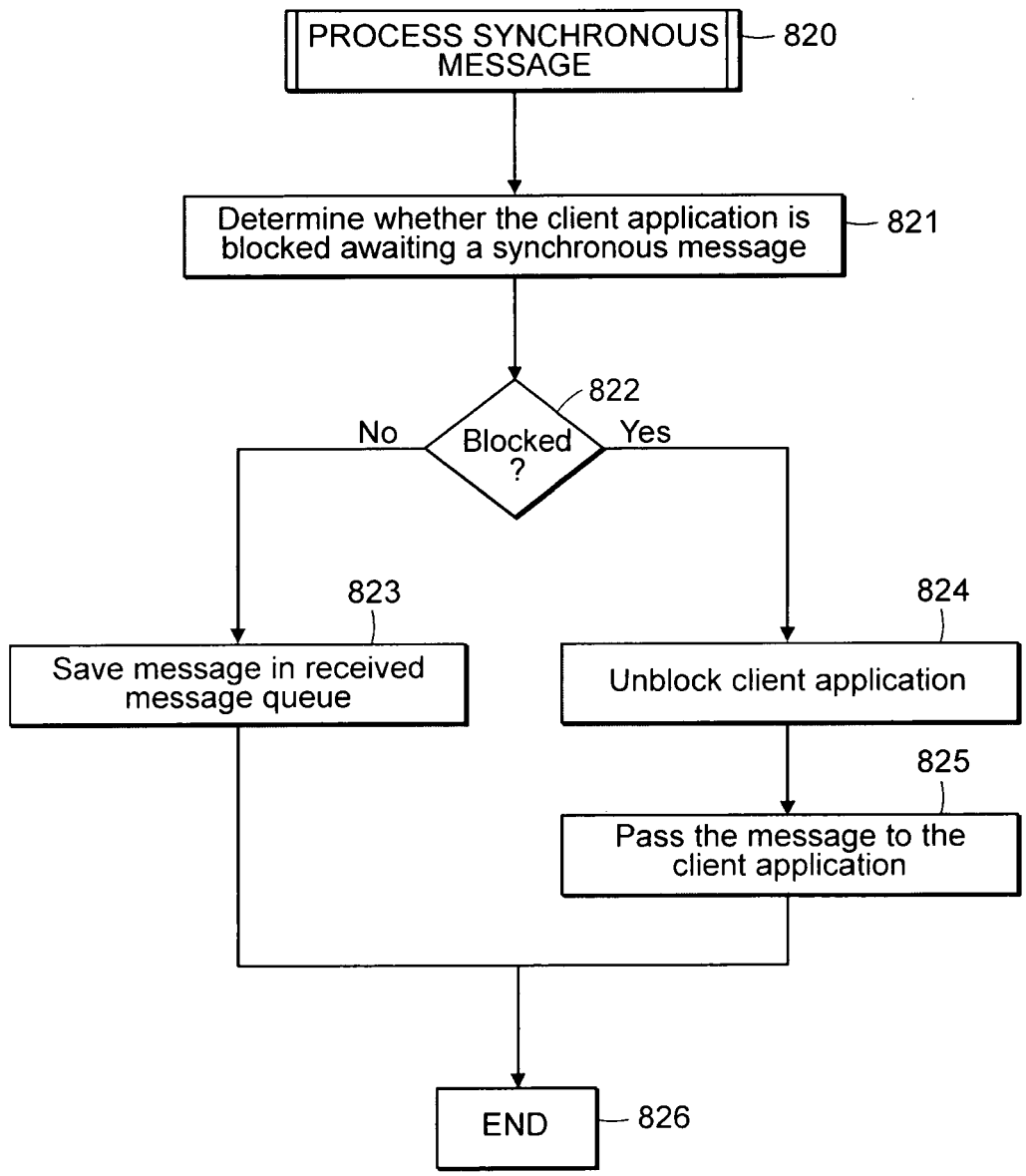
FIG. 8B is a logic flow diagram showing exemplary Message Passing Service logic for processing a synchronous message in accordance with an embodiment of the present invention.
Figure 8C:
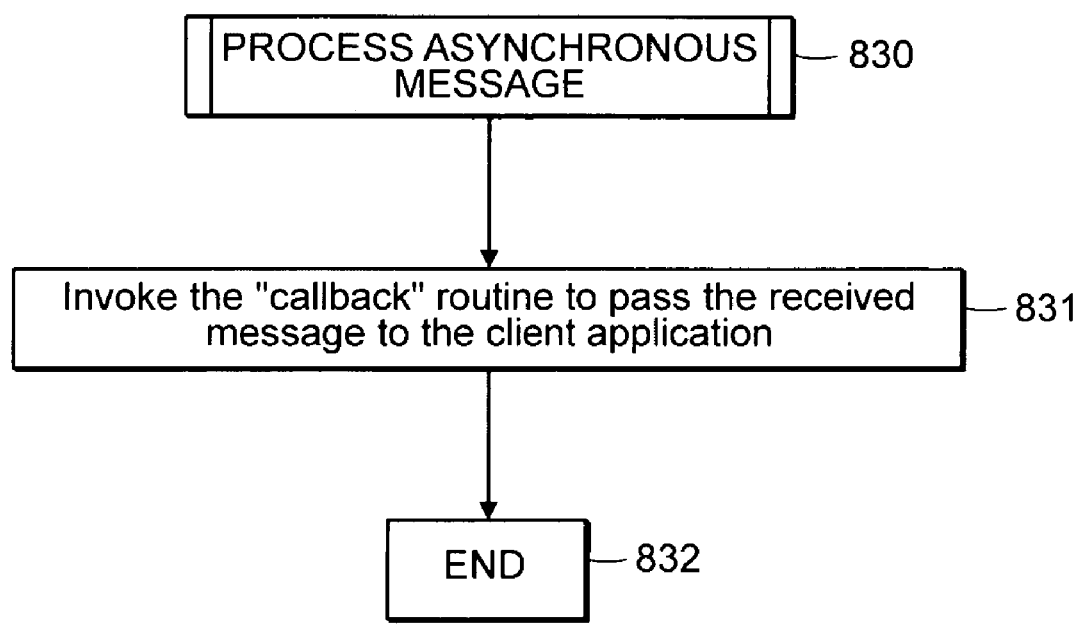
FIG. 8C is a logic flow diagram showing exemplary Message Passing Service logic for processing an asynchronous message in accordance with an embodiment of the present invention.

FIG. 8A is a logic flow diagram showing exemplary MPS logic for processing a message received from the MPS Target. Beginning in step 802, and upon receiving a message for the MPS Client from the MPS Target, in step 804, the MPS first sends a confirmation to the MPS Target, in step 806. The MPS then determines the message type (synchronous or asynchronous) based upon the tag included in the message, in step 808. If the received message is a synchronous message (SYNCHRONOUS in step 810), then the MPS processes the synchronous message, in step 820. Specifically, as shown in FIG. 8B, the MPS determines whether the MPS Client is blocked awaiting a synchronous message, in step 821. If the MPS Client is not blocked awaiting a synchronous message (NO in step 822), then the MPS saves the message in the received message queue associated with the connection, in step 823. However, if the MPS Client is blocked awaiting a synchronous message (YES in step 822), then the MPS unblocks the MPS Client, in step 824, and passes the message to the MPS Client, in step 825. If the received message is an asynchronous message (ASYNCHRONOUS in step 810), then the MPS processes the asynchronous message, in step 830. Specifically, as shown in FIG. 8C, the MPS invokes the "callback" routine to pass the received message to the MPS Client, in step 831. The logic terminates in step 899.

In a preferred embodiment of the present invention, the MPS is used for communication between storage processors in a computer storage system. In a common computer system architecture, a host computer is coupled to a computer storage system that provides non-volatile storage for the host computer. The computer storage system includes, among other things, a number of interconnected storage units. Each storage unit includes a number of physical or logical storage media (for example, a disk array). For convenience, a group of one or more physical disks that are logically connected to form a single virtual disk is referred to hereinafter as a "Logical Unit" (LU). Data from the host computer is stored in the computer storage system, and specifically in the various storage units within the computer storage system.

The computer storage system preferably includes redundant systems in order to ensure data integrity and availability. Specifically, each storage unit includes redundant subsystems such as multiple storage processors and multiple disks in order to ensure continued operation in the case of a subsystem failure, and the various storage units in the computer storage system interoperate to ensure continued operation in the case of a complete storage unit failure.

In addition to ensuring continued operation during failures, the interoperation of the various storage units in the computer storage system together with the redundant subsystems within each storage unit enable the various storage units in the computer storage system to provide many advanced functions. For example, the various storage units in the computer storage system can interoperate to maintain redundant copies of information at geographically disparate locations, and the various storage units in the computer storage system can also interoperate to perform "load balancing" across the various storage units in the computer storage system. A remote mirroring function is described in the related patent application entitled REMOTE MIRRORING SYSTEM, DEVICE, AND METHOD, which was incorporated by reference above. Such interoperation requires special communications between the various storage units in the computer storage system, and more particularly between storage processors running in the various storage units.

Figure 9:
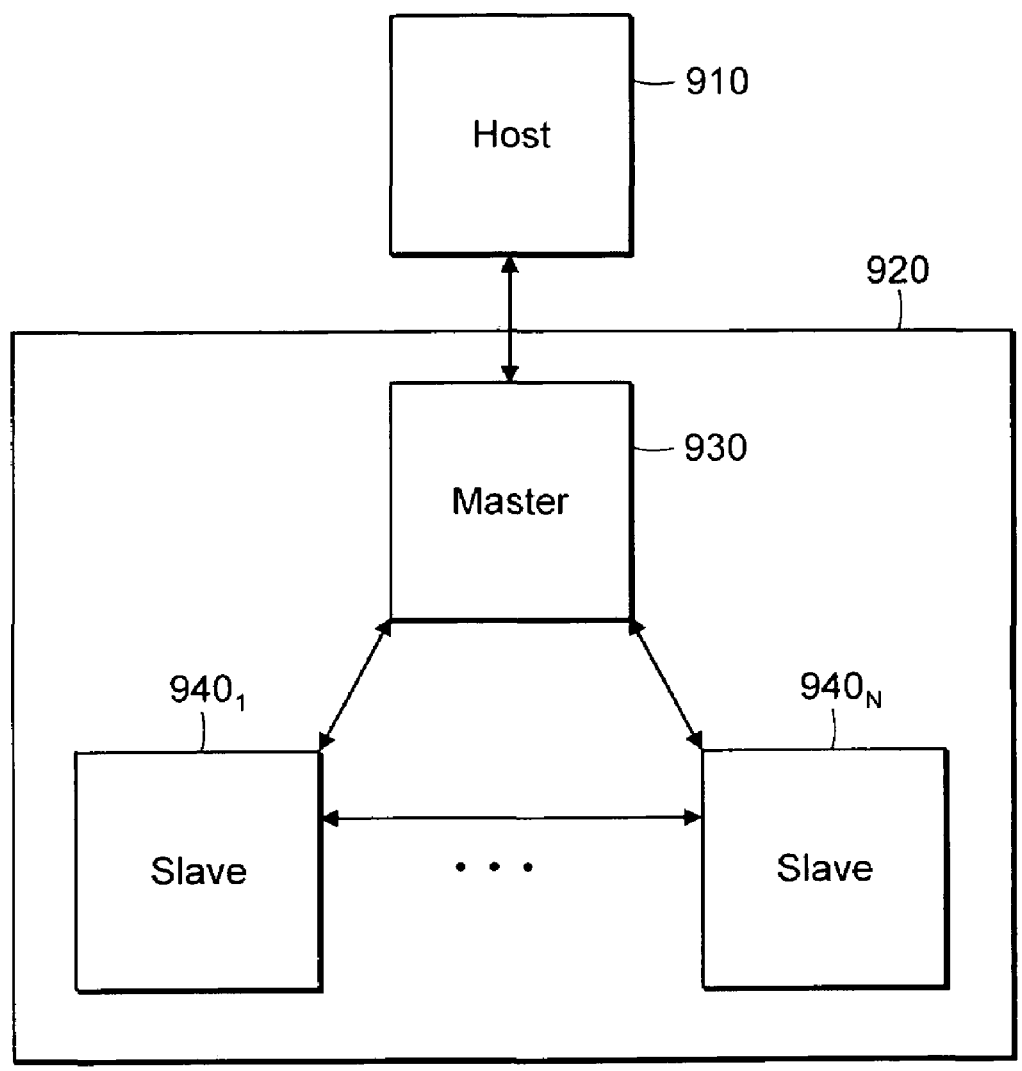
FIG. 9 is a block diagram showing an exemplary computer storage system in accordance with an embodiment of the present invention.

FIG. 9 shows an exemplary computer system 900 in accordance with an embodiment of the present invention. The exemplary computer system 900 includes a host 910 coupled to a computer storage system 920. The computer storage system 920 includes a master storage unit 930 and a number of slave storage units 940$_1$ through 940$_N$. The host 910 is coupled to the master storage unit 930. Certain storage functions, such as remote mirroring, requires each storage unit in the computer storage system 900 to maintain a communication link to all of the other storage units in the computer storage system 900, such that each storage unit is capable of communicating with all of the other storage units in the computer storage system 900.

Figure 10:
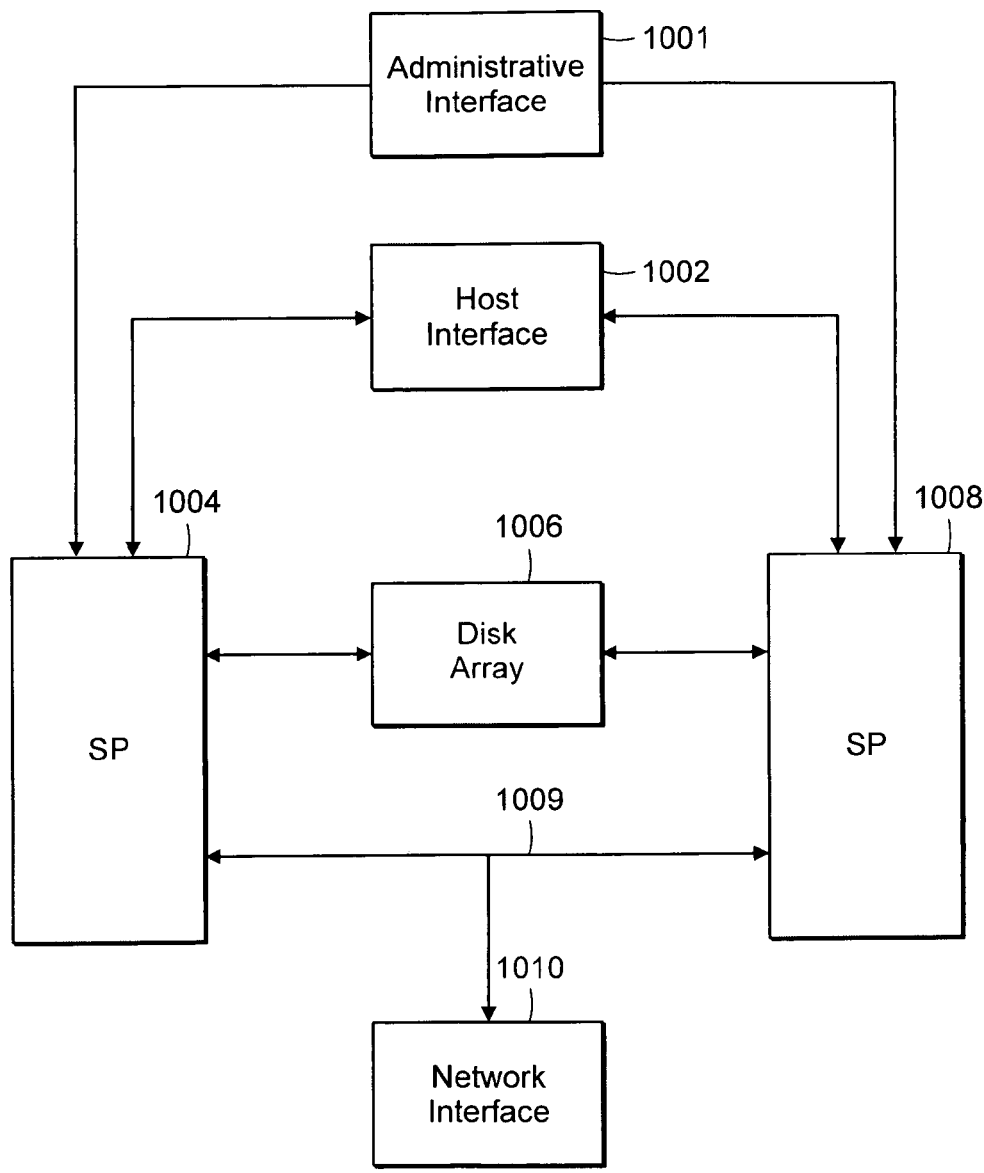
FIG. 10 is a block diagram showing an exemplary storage unit in accordance with an embodiment of the present invention.

In a preferred embodiment of the present invention, each of the storage units in the computer storage system, such as the master storage unit 930 and the slave storage units 940$_1$ through 940$_N$ in the computer storage system 920, is a fault-tolerant RAID (redundant array of independent disks) storage unit with redundant management and storage capabilities. As shown in FIG. 10, a preferred storage unit 1000 includes an Administrative Interface 1001, at least one Host Interface 1002, at least a first Storage Processor (SP) 1004 and an optional second SP 1008, a number of disks arranged as a Disk Array 1006, and a Network Interface 1010. The Administrative Interface 1001 is preferably an Ethernet interface through which the storage unit 1000 is managed and controlled. The Host 910 interfaces with the storage unit 1000 through the Host Interface 1002, which preferably emulates a SCSI interface. The Host Interface 1002 is coupled to the SP 1004 and to the optional SP 1008, such that the Host 910 can communicate with both the SP 1004 and the optional SP 1008. The SP 1004 and the optional SP 1008 are interconnected through an interface 1009, which is preferably a FibreChannel interface. The SP 1004 and the optional SP 1008 are also coupled to the Network Interface 1010 via the interface 1009, which enables each SP (1004, 1008) to communicate with SPs in other storage units within the computer storage system 920. The SPs that are interconnected via the interface 1009 communicate, for example, using the Message Passing Service as described herein.

A preferred SP (1004, 1008) is based upon a commercially available single or multiple processor hardware platform that runs an operating system, such as the Windows NT operating system. Both SPs (1004, 1008) run essentially the same software, although the software can differ between the two SPs, for example, due to a software upgrade of one but not the other SP.

Therefore, each SP (1004, 1008) is capable of providing full management functions for the storage unit.

The SP software requires each LU to be owned and accessed through one and only one SP at a time. This notion of LU ownership is referred to as "assignment." The SP software allows each LU in a LU Array Set to be "assigned" to a different SP. During normal operation of the storage unit, both SPs process requests and perform various management functions in order to provide redundancy for the storage unit. If one of the SPs fails, the other SP takes over management of the LUs for the failed SP. For convenience, the SP that is primarily responsible for managing a particular group of LUs is referred to hereinafter as the "primary" SP, while other SP is referred to hereinafter as the "secondary" SP. For purposes of the following discussion, and with reference again to FIG. 10, the SP 1004 will be referred to as the "primary" SP, and the SP 1008 will be referred to as the "secondary" SP.

Figure 11:
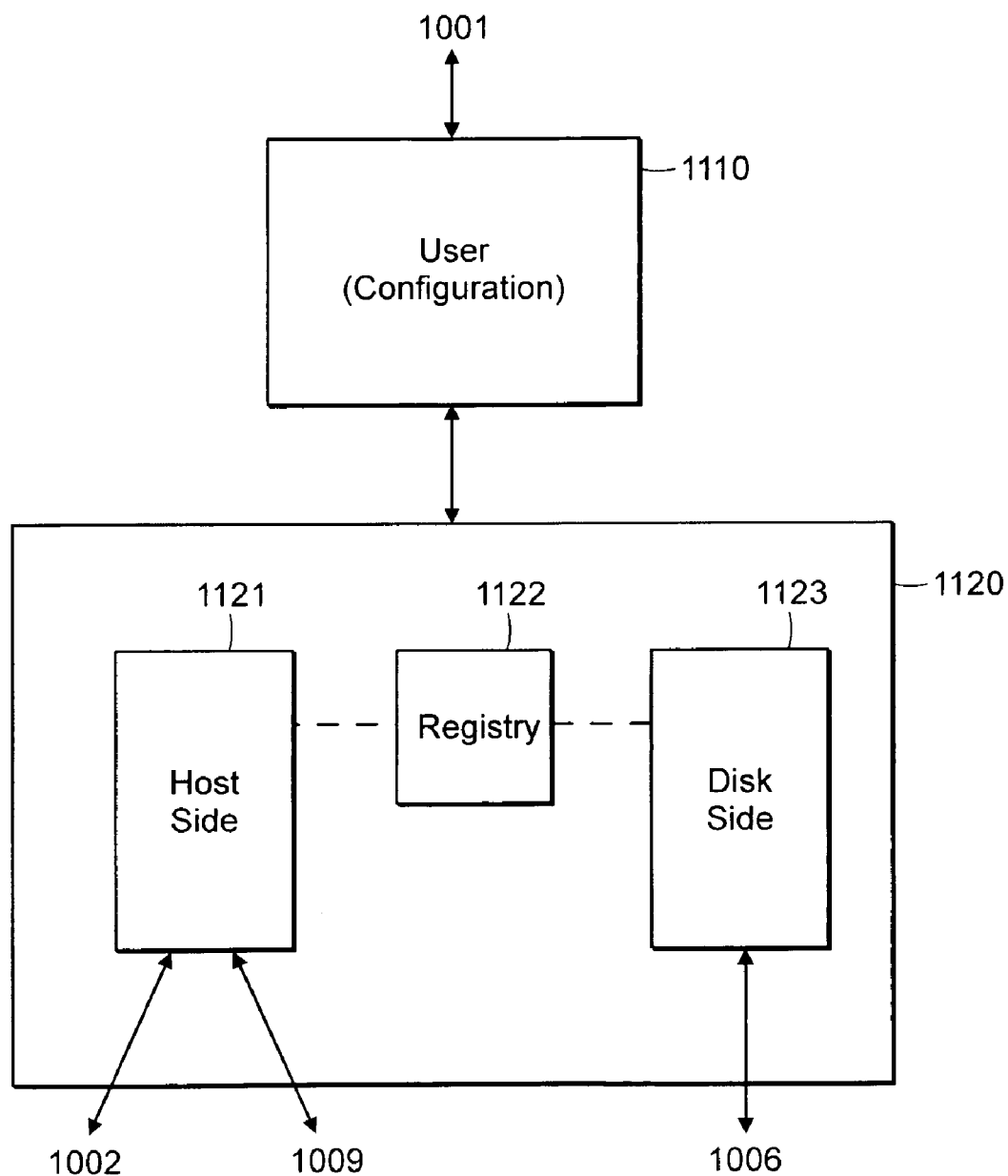
FIG. 11 is a block diagram showing the overall software architecture of exemplary storage processor software in accordance with an embodiment of the present invention.

FIG. 11 is a block diagram showing the general architecture of the SP software 1100. As shown in FIG. 11, the SP software is divided into two general categories, specifically User (Configuration) software 1110 and Kernel software 1120. The User (Configuration) software 1110 includes, among other things, the management protocol stack (TCP/IP) and all user-space software. The Kernel software 1120 is divided into two general areas, specifically Host-Side software 1121 and Disk-Side software 1123. The Host-Side software 1121 emulates a SCSI interface for communication with the Host 910 via the Host Interface 1002. The Disk-Side software 1123 manages the Disk Array 1006 and includes, among other things, software for coordinating information storage within and among the various storage units in the computer storage system.

As described in the related patent application entitled A COMPUTER ARCHITECTURE UTILIZING LAYERED DEVICE DRIVERS, which was incorporated by reference above, the SP software utilizes layered device drivers to allow software functions to be dynamically activated or inactivated, specifically by adding or removing software drivers from a device driver stack, respectively. The layered device drivers are managed using both operating system services as well as the LDD registration system. Therefore, the Kernel software 1120 preferably includes, among other things, a Registry 1122 for registering device drivers with the operating system.

Figure 12:
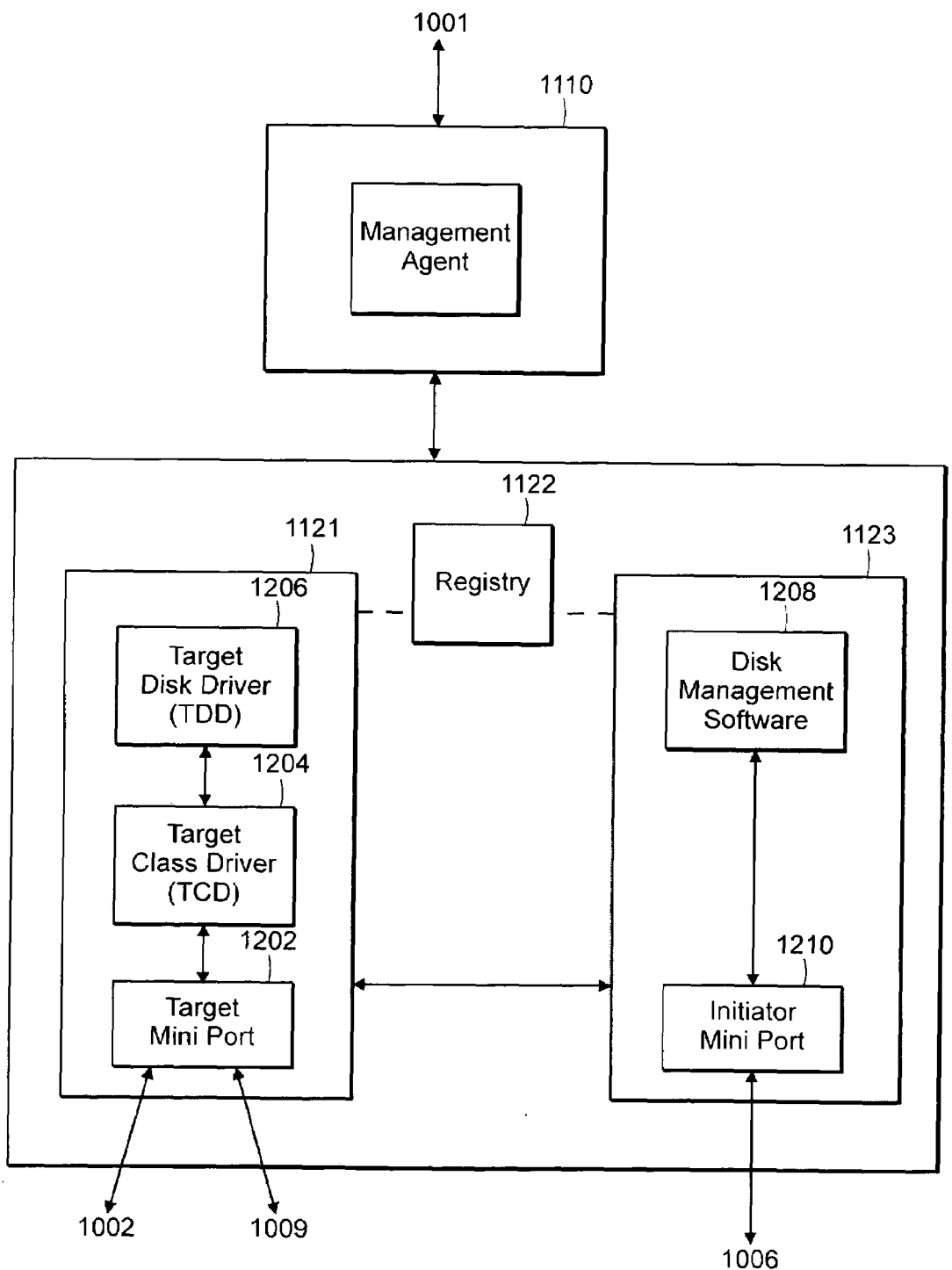
FIG. 12 is a block diagram showing a number of relevant components of a storage processor in accordance with an embodiment of the present invention.

FIG. 12 shows the SP software architecture in greater detail. As shown in FIG. 12, the Host-Side software 1121 includes a number of components, including a Target Miniport 1202, a Target Class Driver (TCD) 1204, and a Target Disk Driver (TDD) 1206. The Target Miniport 1202 emulates a SCSI interface for the Host Interface 1002 as well as the FibreChannel interface 1009 for inter-SP communication. The Disk-Side software 1123 includes a number of components, including the disk management software 1208 and an Initiator Miniport 1210. The Initiator Miniport 1210 provides an interface to the Disk Array 1006. The User (Configuration) software 1110 also includes a number of components, including a Management Agent 1214 for interfacing to a manager (not shown).

Figure 13:
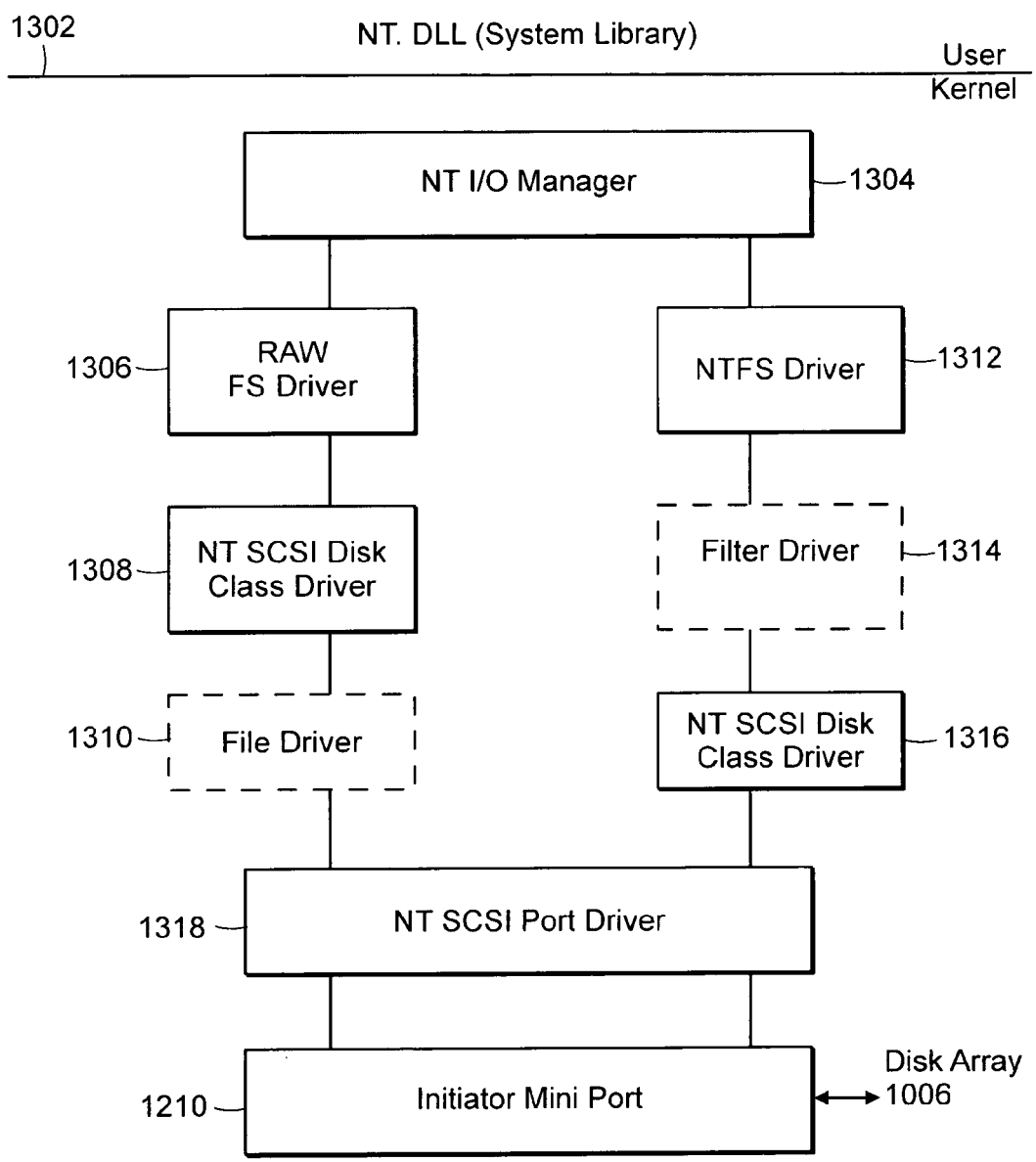
FIG. 13 is a block diagram showing a number of relevant components for disk configuration under the Windows NT operating system.

In a preferred embodiment of the present invention, each SP runs the Windows NT operating system. Within the Windows NT operating system, when a process makes a call to the Win32 Application Program Interface (API), the call is interpreted by a Windows NT Dynamically Linked Library (DLL) 1302, as shown in FIG. 13. For file or device operations, the DLL 1302 makes a system call, which is handled by the Windows NT Input/Output (I/O) Manager 1304. If the operation is for a file on a file system, then the Windows NT I/O Manager 1304 calls a file system driver, which, in this case, is a NTFS Driver 1312. If the NTFS Driver 1312 needs to perform input/output operations, then the NTFS Driver 1312 makes a call to a disk class driver below it in the stack, which in this case is the Windows NT SCSI Disk Class Driver 1316. The call may be intercepted and processed by a Filter Driver 1314 before being processed by the Windows NT SCSI Disk Class Driver 1316. If an I/O operation is to a "raw" disk, then the Windows NT I/O Manager 1304 calls a RAW File System (FS) Driver 1306, which in turn calls the Windows NT SCSI Disk Class Driver 1308. The output from the Windows NT SCSI Disk Class Driver 1308 may be processed by a Filter Driver 1310. In either case, the Windows NT SCSI Port Driver 1318 is called to send SCSI commands to devices via the Initiator Miniport 1210.

Figure 14:
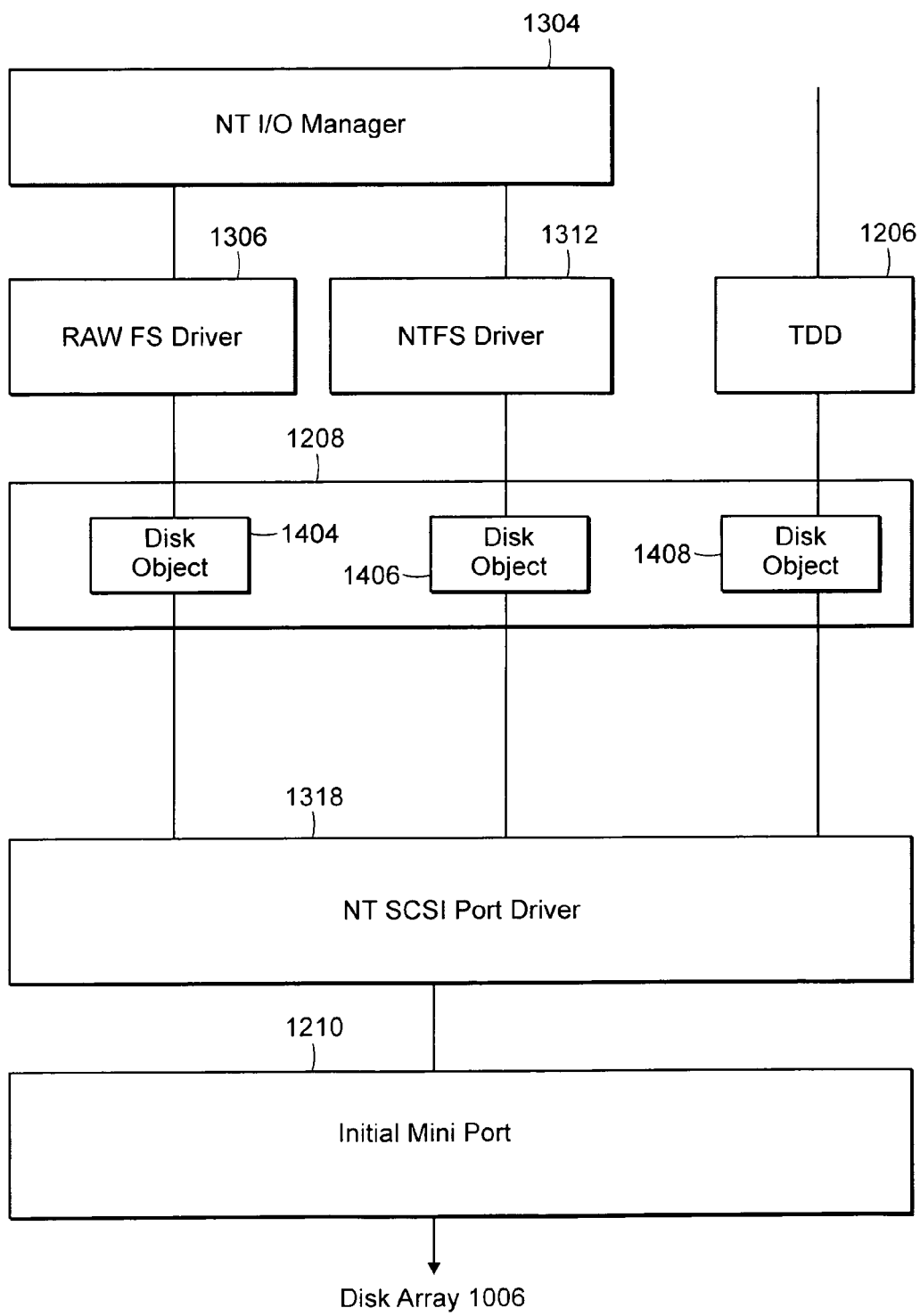
FIG. 14 is a block diagram showing a number of relevant disk-side components in accordance with an embodiment of the present invention.

The components on the Disk-Side 1123 present a standard Windows NT disk class interface and implement various fault tolerant disk strategies. These various fault tolerant disk strategies are performed by the Disk Management Software 1208. As shown in FIG. 14, the Disk Management Software 1208 includes a number of Disk Objects (1404, 1406, 1408) which are installed as filter drivers in the I/O stacks in order to intercept and process device operations.

Figure 15:
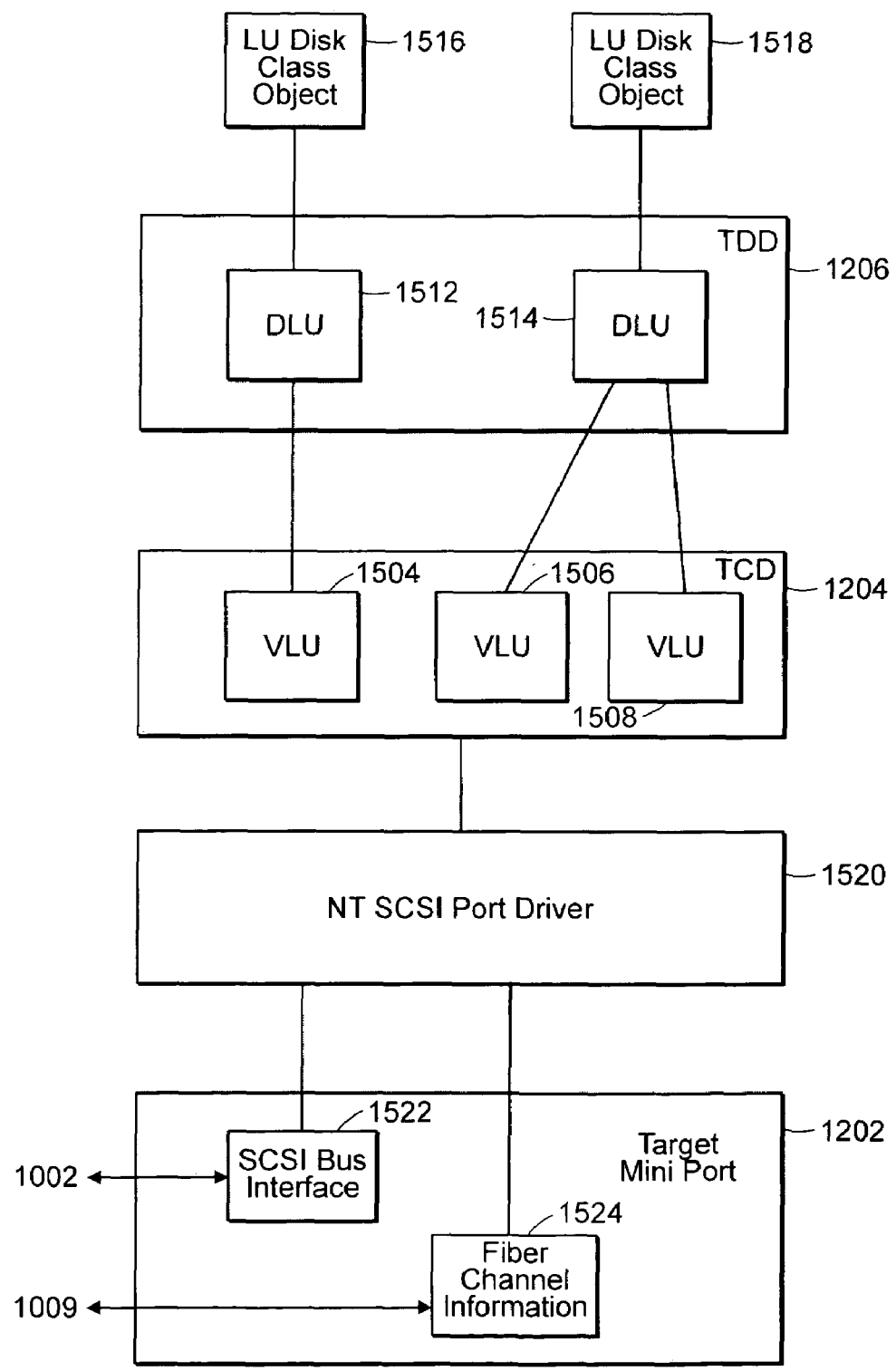
FIG. 15 is a block diagram showing a number of relevant host-side components in accordance with an embodiment of the present invention.

The Host-Side software 1121 contains a set of drivers that emulate a disk drive interface, making the storage unit appear to the Host 910 as an external disk drive. The Host 910 controls the storage unit through the Host-Side software 1121, although the actual storage is provided by a disk class object from the Disk-Side 1123. FIG. 15 shows the relationship between various Host-Side 1121 components. The Host 910 interfaces to the storage unit through the Target Miniport 1202, and specifically through a SCSI Bus Interface 1522 that is coupled to the Host Interface 1002. The SP interfaces to other SPs through the Target Miniport 1202, and specifically through a Fibre Channel Interface 1524 via the interface 1009. Information communicated to or from the Target Miniport 1202 is processed by the NT SCSI Port Driver 1520, which makes any necessary conversions to or from SCSI format. The NT SCSI Port Driver is coupled to the Target Class Driver (TCD) 1204, which essentially connects the Target Miniport 1202 to the actual storage and implements most of the basic SCSI protocols. The TCD 1204 creates a number of Virtual Logical Unit (VLU) objects (1504, 1506, 1508), each representing a LU from the perspective of the Disk-Side software 1123. The Target Disk Driver (TDD) 1206 implements SCSI disk semantics. Its primary purpose is to implement Disk Logical Unit (DLU) objects (1512, 1514). Each DLU object (1512, 1514) sits on top of a disk class object (1516, 1518) presented by a lower level driver. The TDD 1206 examines all incoming commands and either services a particular command or delegates the command to the underlying disk class object.

The MPS enables the MPS Client running on a particular SP (referred to hereinafter as the "Client SP") to communicate with the MPS Target running on another SP within the computer storage system (referred to hereinafter as the "Target SP"). The MPS Client may be either a user-mode application or a kernel-mode application running within the Client SP. The Target SP may be within the same storage unit as the Client SP or within a different storage unit than the Client SP. The MPS provides for both synchronous and asynchronous message exchanges between the MPS Client and the MPS Target, although a user-mode MPS Client communicates exclusively using synchronous message exchanges in a preferred embodiment of the present invention.

In order to establish communication links to other SPs in the computer storage system, each SP includes a Communication Manager Interface (CMI). The CMI is a component of the Disk-Side software 1123. The CMI enables a component running on a particular SP to establish a communication link to a peer component in another SP. The other SP can be in the same storage unit or in a different storage unit. For convenience, a CMI communication link is referred to hereinafter as a "conduit." The CMI is preferably implemented as a layered device driver as described in the related patent application entitled A COMPUTER ARCHITECTURE UTILIZING LAYERED DEVICE DRIVERS, which was incorporated by reference above.

Figure 16:
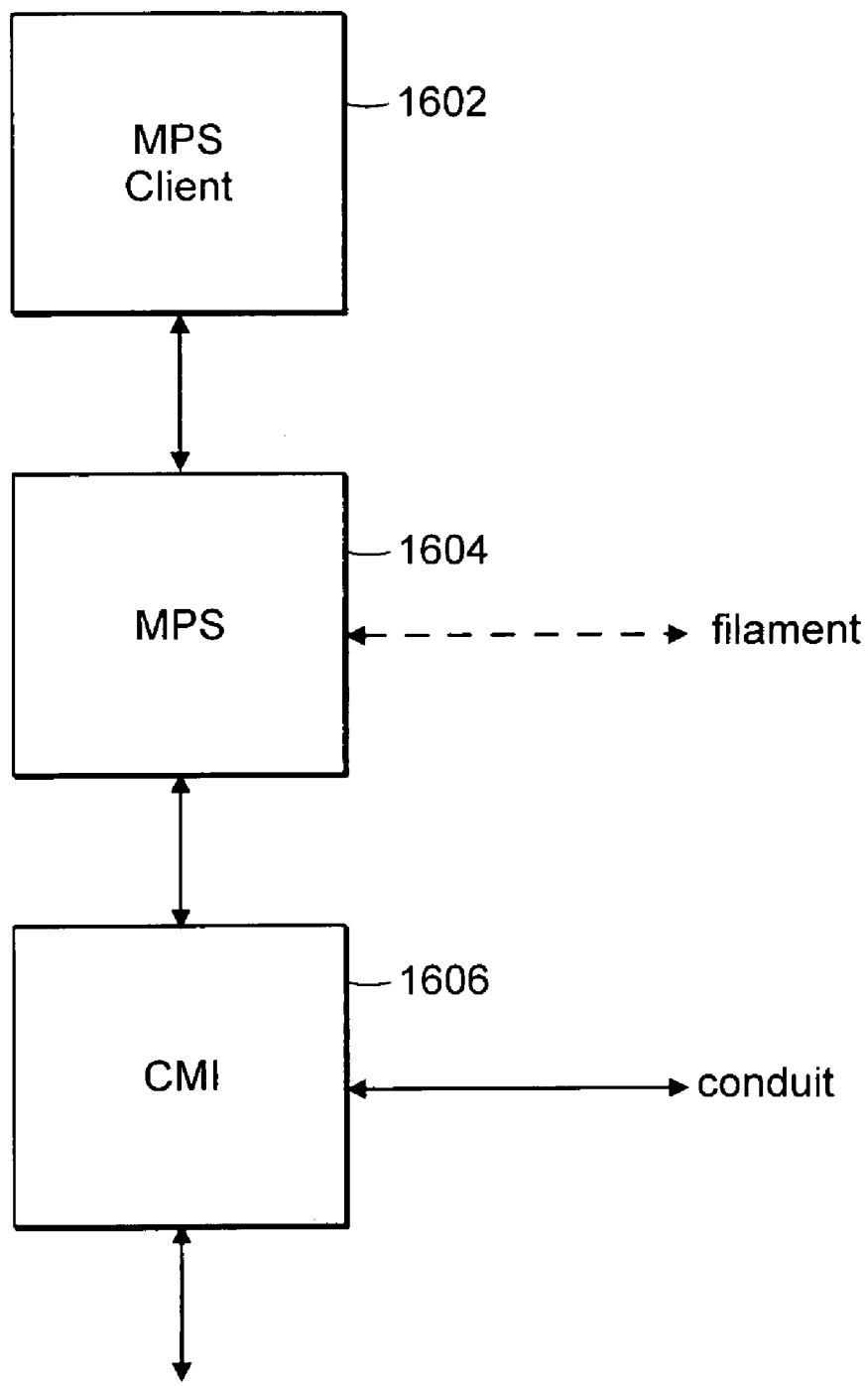
FIG. 16 is a block diagram showing an exemplary communication stack including a MPS Client, a MPS layer, and a CMI layer in accordance with an embodiment of the present invention.

The MPS enhances the functionality of CMI by multiplexing a dynamic number of MPS sessions onto a single CMI conduit, and utilizes CMI services to send and receive messages over a conduit. Thus, the MPS is preferably implemented as a layered device driver above the CMI layered device driver as described in the related patent application entitled A COMPUTER ARCHITECTURE UTILIZING LAYERED DEVICE DRIVERS, which was incorporated by reference above. The MPS Client utilizes services provided by the MPS, and is therefore implementationally above the MPS layer in the communication stack. FIG. 16 shows the relationship between the MPS Client 1602, the MPS layer software 1604, and the CMI layer software 1606 in the communication stack.

In order to communicate with target applications, such as the MPS Target, the MPS Client opens a MPS session over an existing CMI conduit. A MPS session is essentially a named memory location or "mailbox." When the MPS Client opens a MPS session, the MPS Client provides a mailbox name and a domain name to the MPS. The MPS assigns a unique name to the mailbox (referred to hereinafter as the "filament handle") based upon the mailbox name and domain name provided by the MPS Client, and returns the filament handle to the MPS Client.

Once the MPS session is opened, the MPS Client can communicate with any target application that has an opened MPS session on the same CMI conduit. However, the MPS Client can also dedicate the MPS session to a particular MPS Target, in which case the MPS Client uses the filament handle to correlate transactions between the MPS Client and the MPS Target. Specifically, the MPS Client specifies the filament handle in order to direct the MPS to the corresponding filament, in which case the MPS uses the filament handle to identify the filament for communication. Similarly, the MPS specifies the filament handle when notifying the MPS Client of certain events, such as completing a message transmission over the MPS session, receiving a message over the MPS session, and closing the MPS session.

In order to support asynchronous message passing from the MPS to the MPS Client, the MPS associates each open MPS session with a corresponding "callback" routine. Thus, when the MPS Client opens the MPS session, the MPS Client provides a corresponding "callback" routine (in addition to the domain name and other parameters, which are described below) to the MPS. The MPS executes the "callback" routine to pass information to the MPS Client asynchronously, for example, when the MPS receives a MPS message for the MPS Client, the MPS receives a notification regarding a previously sent message (for example, an acknowledgment), or the MPS closes the corresponding MPS session.

Thus, for each open MPS session, the MPS keeps track of at least the mailbox name, the "callback" routine, and a MPS session status indicating whether or not the MPS session is in the process of being closed. The MPS Client may also associate a context with the MPS session, in which case the MPS also keeps track of the context for the MPS session. The context may be used by the MPS Client, for example, as a way to manage multiple MPS sessions. The MPS also maintains a linked list of outstanding transmissions and a linked list of pending synchronous receive operations.

When the MPS Client wants to communicate with a particular target application, such as the MPS Target, the MPS Client must first obtain the address associated with the target application. In a preferred embodiment of the present invention, the MPS Client obtains the target application address using a special interface routine (described in detail below).

When the MPS Client wants to transmit a message to the MPS Target, the MPS Client uses a sequence tag (described-below) to specify whether the MPS should transmit the message synchronously or asynchronously. When the MPS Client sends a synchronous message, the MPS "blocks" the MPS Client until a confirmation is received from the MPS Target, so that the MPS Client does not continue processing until the confirmation is received from the MPS Target. When the MPS Client sends an asynchronous message, the MPS Client continues processing, and the MPS notifies the MPS Client through the "callback" mechanism when the confirmation is received.

When the MPS Client wants to receive a synchronous message from the MPS Target, the MPS Client invokes a special interface routine (described in detail below). If there is already a received message pending for the MPS Client, then the MPS passes the received message to the MPS Client. However, if there is not already a received message pending for the MPS Client, then the MPS "blocks" the MPS Client until a message is received.

Thus, when MPS receives a synchronous message for the MPS Client, the MPS determines whether the MPS Client is "blocked" awaiting a message. If the MPS Client is "blocked" awaiting a message, then the MPS "unblocks" the MPS Client and passes the received message to the MPS Client. If the MPS Client is not "blocked" awaiting a message, then the MPS places the received message on a received message queue.

The MPS Client interfaces with the MPS through an Application Program Interface (API). The MPS API defines a number of interface data types, interface data structures, and interface routines. The interface data types and interface data structures define the content and format of certain information that is exchanged between the MPS Client and the MPS Software. The various interface data types, interface data structures, and interface routines are described below.

One interface data type, referred to as NTSTATUS, defines various status values for exchange over the API. Exemplary status values includes STATUS_SUCCESS for indicating that an operation was successful, STATUS-_PENDING for indicating that an operation is pending, and STATUS_INSUFFICIENT_RESOURCES for indicating that an operation failed dur to insufficient resources.

Another interface data type, referred to as CMI_SP_ID, defines a SP identifier for utilizing the CMI service. The MPS Client provides an SP identifier to the MPS in order to send a message to a particular SP. The MPS provides an SP identifier to the MPS Client in order to indicate the SP from which a message was received.

Another interface data type, referred to as the MPS_HANDLE, defines a filament handle for exchange over the API. The filament handle identifies the appropriate mailbox to the MPS.

One data structure, referred to as the MPS_SEND_MESSAGE_INFO, defines the content and format of a transmit descriptor that is used by the application to instruct the MPS to send a message over a particular filament. The MPS_SEND_MESSAGE_INFO data structure includes a Context Handle field, a Destination field, a Message Pointer field, a Size field, and a Sequence Tag field. The Context Handle field specifies a context for the MPS session, if the MPS Client supports the use of a context. The Destination field specifies the destination SP for the message. The Message Pointer field is a pointer to a non-paged message buffer in which the message is stored. The Size field indicates the length (in bytes) of the message. The Sequence Tag field specifies a transaction number that is used to correlate messages associated with a single transaction (for example, matching a response message to its corresponding transmit message). The various fields of an exemplary MPS_SEND_MESSAGE_INFO data structure are defined as follows:

```
MPS_SEND_MESSAGE_INFO
{
        PVOID          ContextHandle;
        CMI_SP_ID      Destination;
        PVOID          Ptr;
        ULONG          Size;
        ULONG          SequenceTag;
}
```

Another data type, referred to as the MPS_EVENT, defines various events for exchange over the API. In a preferred embodiment of the invention, three events are defined. A MpsEventCloseCompleted event indicates that a particular MPS session closed successfully. A MpsEventMessageSent event indicates that a transmission was completed for a particular MPS session. A MpsEventMessageReceived event indicates that a message was received for a particular MPS session. Each event is associated with an event-specific data structure that is used by the MPS to convey event-specific information to the application.

The event-specific data structure for conveying information relating to the MpsEventCloseCompleted event is referred to as the MPS_CLOSE_EVENT_DATA. The MPS_CLOSE_EVENT_DATA data structure includes a Filament Handle field and a Close Status field. The Filament Handle field specifies the filament handle associated with the closed MPS session. The Close Status field indicates a status of the closed MPS session. The various fields of an exemplary MPS_CLOSE_EVENT_DATA data structure are defined as follows:

```
MPS_CLOSE_EVENT_DATA
{
        MPS_HANDLE     FilamentHandle;
        NTSTATUS       CloseStatus;
}
```

The event-specific data structure for conveying information relating to the MpsEventMessageSent event is referred to as the MPS_SEND_EVENT_DATA. The MPS_SEND_EVENT_DATA data structure includes a Context Handle field and a Transmission Status field. The Context Handle field specifies the handle of the MPS session. The Transmission Status field indicates a message transmission status (i.e., successful or unsuccessful). The various fields of an exemplary MPS_SEND_EVENT_DATA data structure are defined as follows:

```
MPS_SEND_EVENT_DATA
{
        PVOID          ContextHandle;
        NTSTATUS       TransmissionStatus;
}
```

The event-specific data structure for conveying information relating to the MpsEventMessageReceived event is referred to as the MPS_RECEIVED_EVENT_DATA. The MPS_RECEIVED_EVENT_DATA data structure includes a Message Pointer field, a Sender field, a Size field, and a SynchronousStatus field. The Message Pointer field is a pointer to a non-paged message buffer in which the received message is stored. The Sender field indicates the SP from which the message was received. The Size field indicates the length (in bytes) of the received message. The SynchronousStatus field indicates a status of a synchronous receive operation. The various fields of an exemplary MPS_RECEIVED_EVENT_DATA data structure are defined as follows:

```
MPS_RECEIVED_EVENT_DATA
{
        PVOID          Ptr;
        CMI_SP_ID      Sender;
        ULONG          Size;
        NTSTATUS       SynchronousStatus;
}
```

The MPS Client invokes various MPS service routines in order to utilize MPS services. Each MPS service routine requires certain input parameters, which the MPS Client provides upon invoking a particular MPS service routine. Each MPS service routine returns a status code indicating the status of the particular MPS service, and may also return certain output parameters to the MPS Client.

The MPS Client invokes a MpsOpen routine to open a MPS session. The MPS Client specifies a "callback" routine, a conduit identifier, a domain name, a mailbox, and an optional context handle. The MpsOpen routine returns a status indicator indicating whether the operation was successful or unsuccessful (i.e., whether or not the MPS session was successfully opened, respectively), and if successful, also returns a filament handle. The following is an exemplary function definition for the MpsOpen routine:

NTSTATUS MpsOpen(
   IN NTSTATUS (* CallbackRoutine)(MPS_EVENT Event, PVOID Data),
   IN CMI_CONDUIT_ID Conduit,
   IN ULONG DomainName,
   IN PWCHAR pMailboxName,
   IN PVOID Context,
   OUT PMPS_HANDLE pFilamentHandle);

The CallbackRoutine parameter is a pointer to the client "callback" routine. The Conduit parameter is a conduit identifier. The DomainName parameter is a character string of up to four (4) characters that specifies a mailbox name space. The pMailboxName parameter is a pointer to a wide character string representation of the mailbox name. The Context parameter is a pointer to a context handle. The pFilamentHandle is a pointer to a memory location in which the MpsOpen routine returns the filament handle. The return value indicates the status of the MPS open operation.

The MPS Client invokes a MpsClose routine to close a MPS session. Closing the MPS session frees system resources associated with the MPS session. The MPS Client specifies the filament handle for the MPS session. The MpsClose routine returns a status indicator indicating whether the MPS session was closed or the close operation is pending.

The MpsClose routine can close the MPS session synchronously or asynchronously. If there are no outstanding transmissions or synchronous receive requests for the MPS session, then the MpsClose routine closes the MPS session synchronously, and returns the status indicator indicating that the MPS session was closed. Otherwise, the MpsClose routine returns the status indicator indicating that the close operation is pending, in which case the MpsClose routine closes the MPS session after all outstanding transmissions and synchronous receive requests are satisfied and notifies the MPS Client asynchronously via the "callback" routine. The following is an exemplary function definition for the MpsClose routine:
NTSTATUS MpsClose (IN OUT MPS_HANDLE FilamentHandle);

The FilamentHandle parameter is the filament handle associated with the MPS session. The return value indicates the status of the close operation.

The MPS Client invokes a MpsAllocateMessage routine to obtain a non-paged memory buffer for a transmit message. The MPS Client specifies the amount of memory needed as well as a memory location for returning a pointer to the allocated memory buffer. The MpsAllocateMessage routine returns a pointer to the allocated memory buffer as well as a status indicator. The following is an exemplary function definition for the MpsAllocateMessage routine:
NTSTATUS MpsAllocateMessage (IN ULONG Size, OUT PVOID *Ptr);

The Size parameter indicates the amount of memory requested in bytes. It should be noted that the MPS permits zero-length messages. The Ptr parameter is a pointer to a memory location in which the MpsAllocateMessage returns a pointer to the allocated memory buffer. The return value indicates the status of the memory allocation operation.

The MPS Client invokes a MpsFreeMessage routine to free a non-paged memory buffer. The MPS Client specifies a pointer to the non-paged memory buffer. It should be noted that the non-paged memory buffer must have been allocated by the MpsAllocateMessage routine. The MpsFreeMessage routine returns a status indicator. The following is an exemplary function definition for the MpsFreeMessage routine:
NTSTATUS MpsFreeMessage (IN OUT PVOID Ptr);

The Ptr parameter is a pointer to a non-paged block of memory to be freed. The return value indicates the status of the operation.

The MPS Client invokes a MpsAsynchronousSend routine to transmit an asynchronous message over a particular MPS session. The MPS Client specifies a filament handle as well as a transmit descriptor of the form MPS_SEND_MESSAGE_INFO. The MpsAsynchronousSend routine returns a status indicator, specifically whether or not the MpsAsynchronousSend routine was able to proceed with the asynchronous send operation. The MpsAsynchronousSend routine may be unable to proceed with the asynchronous send operation, for example, if the MPS session is not open, the MPS session is pending closure, the destination is invalid, the memory buffer is invalid, the memory buffer is already in use, or the message size is too large. It should be noted that the asynchronous send operation may subsequently fail, in which case the MPS Client is notified asynchronously via the "callback" routine. The following is an exemplary function definition for the MpsAsynchronousSend routine:
NTSTATUS MpsAsynchronousSend(
　IN MPS_HANDLE FilamentHandle,
　IN PMPS_SEND_MESSAGE_INFO pSendMessageInfo);

The FilamentHandle parameter is the filament handle. The pSendMessageInfo parameter is a pointer to an initialized data structure of the form MPS_SEND_MESSAGE_INFO. The return value indicates the status of the asynchronous send operation.

The MPS Client invokes a MpsSynchronousSend routine to transmit a synchronous message over a particular MPS session. The MPS Client specifies a filament handle as well as a transmit descriptor of the form MPS_SEND_MESSAGE_INFO. The MpsSynchronousSend routine returns a status indicator, specifically whether or not the MpsSynchronousSend routine was able to complete the synchronous send operation. The MpsSynchronousSend routine may be unable to complete the synchronous send operation, for example, if the MPS session is not open, the MPS session is pending closure, the destination is invalid, the memory buffer is invalid, the memory buffer is already in use, or the message size is too large. The following is an exemplary function definition for the MpsSynchronousSend routine:
NTSTATUS MpsSynchronousSend (
　IN MPS_HANDLE FilamentHandle,
　IN PMPS_SEND_MESSAGE_INFO pSendMessageInfo);

The FilamentHandle parameter is the filament handle. The pSendMessageInfo parameter is a pointer to an initialized data structure of the form MPS_SEND_MESSAGE_INFO. The return value indicates the status of the synchronous send operation.

The MPS Client invokes a MpsSynchronousReceive routine to receive a synchronous message over a particular MPS session. The MPS Client specifies a filament handle, a timeout value, and a transaction identifier. The MpsSynchronousReceive routine returns a pointer to a received message as well as a status indicator. The MpsSynchronousReceive routine completes synchronously whether or not there is a message waiting on the synchronously received message queue when the MpsSynchronousReceive routine is invoked. If there is no message waiting on the synchronously received message queue when the MpsSynchronousReceive routine is invoked, then the MpsSynchronousReceive routine suspends the MPS Client task until a message becomes available, at which time the MpsSynchronousReceive routine returns a pointer to the receive message buffer. The following is an exemplary function definition for the MpsSynchronousReceive routine:
NTSTATUS MpsSynchronousReceive (
　IN MPS_HANDLE FilamentHandle,
　IN LONG Timeout,
　IN ULONG TransactionId,
　OUT PMPS_RECEIVED_EVENT_DATA *pReceivedEventData);

The FilamentHandle parameter is the filament handle. The Timeout parameter specifies the amount of time to wait before the request terminates, where a negative timeout value indicates that the wait time is indefinite, a timeout value of zero (0) indicates a "test" to determine whether the message is pending on the queue, and a timeout value greater than zero indicates the number of seconds to wait. The TransactionId parameter is a transaction identifier used by the MPS Client for correlating transactions. The pReceivedEventData is a pointer to a memory location in which the MpsSynchronousReceive routine stores a pointer to the receive message buffer. The return value indicates the status of the receive operation.

The MPS Client invokes a MpsReleaseReceivedMessage routine to release a receive message buffer and clean up resources associated with the released receive message buffer. A receive message buffer must be released in order to make the receive message buffer and its associated resources available for receiving subsequent messages. The receive message buffer can be from a synchronous receive operation or an asynchronously received message. Among other things, the MPS Client specifies a pointer to the message buffer to be released. The MpsReleaseReceivedMessage routine returns a status indicator. The following is an exemplary function definition for the MpsReleaseReceivedMessage routine:

NTSTATUS MpsReleaseReceivedMessage (IN OUT PVOID Ptr);

The Ptr parameter is a pointer to the receive message buffer. The return value indicates the status of the release operation.

The MPS Client invokes a MpsGetSpId routine to obtain an identifier associated with a particular SP. The following is an exemplary function definition for the MpsGetSpId routine:

NTSTATUS MpsGetSpId (
  IN OUT PCMI_SP_ID pLocalCmiSpId,
  IN OUT PCMI_SP_ID pPeerCmiSpId);

The pLocalCmiSpId parameter is a pointer to the local SP identifier. The pPeerCmiSpId parameter is a pointer to the peer SP identifier. The return value indicates the status of the operation.

The "callback" routine is called by the MPS to handle certain asynchronous events. The MPS specifies the event and provides event-specific data, as described above. The "callback" routine returns a status indicator. The following is an exemplary function definition for the "callback" routine:

NTSTATUS CallbackRoutine (IN MPS_EVENT Event, IN PVOID Data);

The Event parameter indicates the asynchronous event being reported by the MPS. The Data parameter is event-specific data. The return value indicates the status of the "callback" routine.

It should be noted that the above exemplary function definitions are provided to demonstrate the information that is passed between the MPS Client and the MPS in an exemplary embodiment of the present invention. It will be apparent to a skilled artisan that the exemplary function definitions are written in the "C" programming language, and include certain user-defined data types, such as NTSTATUS (predefined status values), PVOID (pointer to void), CMI_CONDUIT_ID (a conduit identifier data structure relating to the CMI service), ULONG (unsigned long), PWCHAR (pointer to a wide-character string), PMPS_HANDLE (pointer to a MPS_HANDLE data structure), PMPS_SEND_MESSAGE_INFO (pointer to a MPS_SEND_MESSAGE_INFO data structure), PMPS_RECEIVED_EVENT_DATA (pointer to a MPS_RECEIVED_EVENT_DATA data structure, and PCMI_SP_ID (pointer to a CMI_SP_ID data structure relating to the CMI service).

In a preferred embodiment of the present invention, predominantly all of the MPS logic is implemented as a set of computer program instructions that are stored in a computer readable medium and executed by an embedded microprocessor system within the SP. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a device that includes a message passing service for providing communication services between a client application and a target application. Exemplary devices include a computer, a storage unit, or a storage processor for operation in a storage unit. The message passing service includes, among other things, application blocking logic for blocking and unblocking the client application and asynchronous signaling logic for notifying the client application of certain asynchronous events. The message passing service also includes session control logic for opening and closing a session between the client application and the target application, synchronous message passing logic for providing synchronous communication services for the client application over the message passing service session using the application blocking logic, and asynchronous message passing logic for providing asynchronous communication services for the client application over the message passing service session using the asynchronous signaling logic. The synchronous message passing logic includes synchronous message sending logic that blocks the client application upon sending the synchronous message and unblocks the client application upon receiving a confirmation from the target application in the other storage processor. The synchronous message passing logic also includes synchronous message receiving logic that blocks the client application if a synchronous message is unavailable for the client application and unblocks the client application upon receiving a synchronous message for the client application. The synchronous message receiving logic passes a synchronous message to the client application if the synchronous message is available for the client application. The asynchronous message passing logic includes asynchronous message sending logic that sends the asynchronous message to the target application and notifies the client application via the asynchronous signaling logic upon receiving a confirmation from the target application in the other storage processor. The asynchronous signaling logic invokes a "callback" routine that is provided by the client application whenever an asynchronous event is available for the client application.

The present invention may also be embodied as a message passing service program for providing communication services between a client application and a remote target application.

The present invention may also be embodied as a message passing method for providing synchronous communication services between a client application running on one processor and a target application running on another processor in a computer system having a plurality of interconnected processors. The message passing method involves receiving from the client application a request for a synchronous communication service, blocking the client application, completing the requested synchronous communication service, and unblocking the client application. More particularly, the message passing method may involve receiving a request from the client application for sending a synchronous message to the target application, blocking the client application, sending the synchronous message to the target application, receiving a confirmation from the target application, and unblocking the client application. The message passing method may also involve receiving a request from the client application for receiving a synchronous message from the target application, determining whether a received message is available for the client application, blocking the client application, if the received message is unavailable, receiving a synchronous message for the client application from the target application, unblocking the client application, and passing the synchronous message to the client application.

The present invention may also be embodied as a message passing method for providing asynchronous communication services between a client application in one storage processor and a target application another storage processor in a computer system having a plurality of interconnected processors. The message passing method involves opening a session between the client application and the target application over an existing communication link, detecting an event relating to the session, and notifying the client application of the event using an asynchronous signaling mechanism. The asynchronous signaling mechanism utilizes a "callback" routine that is provided by the client application. The message passing service notifies the client application of the event by invoking the "callback" routine. The message passing method may further involve sending an asynchronous message from the client application to the client application over the session, receiving a confirmation from the target application over the session, and notifying the client application of the received confirmation. The message passing method may also involve receiving a message for the client application and notifying the client application of the received message. The message passing method may also involve closing the session and notifying the client application that the session has closed.

The present invention may also be embodied as a computer system comprising a first processor in communication with a second processor, wherein the first processor comprises a client application and a message passing service for providing communication services between the client application and a target application running on the second processor.

The present invention may be embodied in other specific forms without departing from the essence or essential characteristics. The described embodiments are to be considered in all respects only as illustrative and not restrictive.

What is claimed is:

1. A device comprising a message passing service for providing communication services between a client application and at least one target application, wherein the message passing service comprises:

application blocking logic operably coupled to block and unblock the client application for supporting synchronous communication services for the client application;

asynchronous signaling logic operably coupled to notify the client application of asynchronous events for supporting asynchronous communication services for the client application;

session control logic operably coupled to open a message passing session over a conduit to allow communications with any of a plurality of target applications that have an open message passing session on the conduit and operably coupled to close the message passing service session;

synchronous message passing logic operably coupled to provide synchronous communication services for the client application over the message passing service session using the application blocking logic, wherein the synchronous message passing logic comprises synchronous message sending logic operably coupled to block the client application using the application blocking logic upon sending a synchronous message to one of the at least one target applications over the message passing service session and unblock the client application using the application blocking logic upon receiving a confirmation from the one of the at least one target applications over the message passing service session; and asynchronous message passing logic operably coupled to provide asynchronous communication services for the client application over the message passing service session using the asynchronous signaling logic.

2. The device of claim 1, wherein the synchronous message passing logic comprises synchronous message receiving logic operably coupled to block the client application using the application blocking logic if a synchronous message is unavailable for the client application.

3. The device of claim 2, wherein the synchronous message receiving logic is operably coupled to unblock the client application using the application blocking logic upon receiving a synchronous message for the client application from one of the at least one target applications over the message passing service session.

4. The device of claim 1, wherein the asynchronous signaling logic comprises a "callback" routine that is provided to the message passing service by the client application.

5. The device of claim 4, wherein the asynchronous signaling logic is operably coupled to invoke the "callback" routine when an asynchronous event is available for the client application.

6. The device of claim 1, wherein said device is a storage processor for operation in a storage unit.

7. A device comprising a message passing service for providing communication services between a client application and at least one target application, wherein the message passing service comprises:
 application blocking logic operably coupled to block and unblock the client application for supporting synchronous communication services for the client application;
 asynchronous signaling logic operably coupled to notify the client application of asynchronous events for supporting asynchronous communication services for the client application;
 session control logic operably coupled to open a message passing session over a conduit to allow communications with any of a plurality of target applications that have an open message passing session on the conduit and operably coupled to close the message passing service session;
 synchronous message passing logic operably coupled to provide synchronous communication services for the client application over the message passing service session using the application blocking logic; and
 asynchronous message passing logic operably coupled to provide asynchronous communication services for the client application over the message passing service session using the asynchronous signaling logic;
 wherein the asynchronous message passing logic comprises asynchronous message sending logic operably coupled to send an asynchronous message to one of the at least one target applications and notify the client application via the asynchronous signaling logic upon receiving a confirmation from the one of the at least one target applications over the message passing service session.

8. The device of claim 7, wherein the asynchronous signaling logic comprises a "callback" routine that is provided to the message passing service by the client application.

9. The device of claim 8, wherein the asynchronous signaling logic is operably coupled to invoke the "callback" routine when an asynchronous event is available for the client application.

10. The device of claim 7, wherein said device is a storage processor for operation in a storage unit.

11. A program product comprising a computer readable medium having embodied therein a message passing service program for providing communication services between a client application and remote target applications, the message passing service program comprising:
 application blocking logic programmed to block and unblock the client application for supporting synchronous communication services for the client application;
 asynchronous signaling logic programmed to notify the client application of asynchronous events for supporting asynchronous communication services for the client application;
 session control logic operably coupled to open a message passing session over a conduit to allow communications with any of a plurality of target applications that have an open message passing session on the conduit and operably coupled to close the message passing service session;
 synchronous message passing logic programmed to provide synchronous communication services for the client application over the message passing service session using the application blocking logic, wherein the synchronous message passing logic comprises synchronous message sending logic programmed to block the client application using the application blocking logic upon sending a synchronous message to one of the target applications over the message passing service session and unblock the client application using the application blocking logic upon receiving a confirmation from the one of the target applications over the message passing service session; and
 asynchronous message passing logic programmed to provide asynchronous communication services for the client application over the message passing service session using the asynchronous signaling logic.

12. The program product of claim 11, wherein the synchronous message passing logic comprises synchronous message receiving logic programmed to block the client application using the application blocking logic if a synchronous message is unavailable for the client application.

13. The program product of claim 12, wherein the synchronous message receiving logic is programmed to unblock the client application using the application blocking logic upon receiving a synchronous message for the client application from one of the target applications over the message passing service session.

14. The program product of claim 11, wherein the asynchronous signaling logic comprises a "callback" routine that is provided to the message passing service program by the client application.

15. The program product of claim 14, wherein the asynchronous signaling logic is programmed to invoke the "callback" routine when an asynchronous event is available for the client application.

16. A program product comprising a computer readable medium having embodied therein a message passing service program for providing communication services between a client application and remote target applications the message passing service program comprising:
 application blocking logic programmed to block and unblock the client application for supporting synchronous communication services for the client application;
 asynchronous signaling logic programmed to notify the client application of asynchronous events for supporting asynchronous communication services for the client application;
 session control logic operably coupled to open a message passing session over a conduit to allow communications with any of a plurality of target applications that have an open message passing session on the conduit and operably coupled to close the message passing service session;
 synchronous message passing logic programmed to provide synchronous communication services for the client application over the message passing service session using the application blocking logic; and
 asynchronous message passing logic programmed to provide asynchronous communication services for the client application over the message passing service session using the asynchronous signaling logic, wherein the asynchronous message passing logic comprises asynchronous message sending logic programmed to send an asynchronous message to a target application and notify the client application via the asynchronous signaling logic upon receiving a confirmation from the target application over the message passing service session.

17. The program product of claim 16, wherein the asynchronous signaling logic comprises a "callback" routine that is provided to the message passing service program by the client application.

18. The program product of claim 17, wherein the asynchronous signaling logic is programmed to invoke the "callback" routine when an asynchronous event is available for the client application.

* * * * *